US012435864B2

(12) United States Patent
Dubs et al.

(10) Patent No.: US 12,435,864 B2
(45) Date of Patent: Oct. 7, 2025

(54) LIGHTING ASSEMBLY AND ILLUMINATION SYSTEM HAVING A LIGHTING ASSEMBLY

(71) Applicant: Gentex Corporation, Zeeland, MI (US)

(72) Inventors: Bradley T. Dubs, Grand Rapids, MI (US); Jason D. Hallack, Zeeland, MI (US); Justin D. Jansen, Hudsonville, MI (US); Ted D. Reeves, Hamilton, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 18/639,260

(22) Filed: Apr. 18, 2024

(65) Prior Publication Data

US 2024/0263767 A1 Aug. 8, 2024

Related U.S. Application Data

(63) Continuation of application No. 17/891,358, filed on Aug. 19, 2022, now Pat. No. 11,994,272.

(Continued)

(51) Int. Cl.

*F21V 21/04* (2006.01)
*F21S 8/02* (2006.01)

(Continued)

(52) U.S. Cl.

CPC ............ *F21V 21/049* (2013.01); *F21S 8/026* (2013.01); *F21V 21/15* (2013.01); *F21V 23/0478* (2013.01)

(58) Field of Classification Search

CPC ............................... F21V 21/049; F21S 8/026

See application file for complete search history.

(56) References Cited

U.S. PATENT DOCUMENTS

| | | | |
|---|---|---|---|
| 2,131,888 A | 10/1938 | Harris | |
| 2,632,040 A | 3/1953 | Rabinow | |

(Continued)

FOREIGN PATENT DOCUMENTS

| | | | |
|---|---|---|---|
| CA | 2367011 A1 | 9/2000 | |
| CN | 104903150 A | 9/2015 | |

(Continued)

OTHER PUBLICATIONS

Hunt, Barry, "Introduction to UV Surface Disinfection," InfectionControl.tips, Jan. 21, 2016, https://infectioncontrol.tips/2016/01/21/1423.

(Continued)

*Primary Examiner* — Zheng Song

(74) *Attorney, Agent, or Firm* — Price Heneveld LLP; Brian James Brewer

(57) ABSTRACT

A lighting assembly includes an upper mount having a pan gear and a plurality of indicator flanges. A lower mount is operably coupled to the lower mount and includes a pan motor and a tilt motor. A printed circuit board is operably coupled to the upper mount and includes a plurality of sensors. At least one sensor is selectively and operably coupled with the plurality of indicator flanges of the upper mount. A light module is operably coupled to the lower mount and includes a tilt gear operably coupled to the lower mount. A controller is operably coupled to the printed circuit board, the pan motor, and the tilt motor and is configured to rotate the lower mount and the light module via the pan motor and is configured to tilt the light module via the tilt motor.

20 Claims, 14 Drawing Sheets

Related U.S. Application Data

(60) Provisional application No. 63/235,384, filed on Aug. 20, 2021.

(51) Int. Cl.
*F21V 21/15* (2006.01)
*F21V 23/04* (2006.01)

(56) References Cited

U.S. PATENT DOCUMENTS 2,827,594 A 3/1958 Rabinow
3,179,845 A 4/1965 Kulwiec
3,581,276 A 5/1971 Newman
3,663,819 A 5/1972 Hicks et al.
D247,367 S 2/1978 Dragan
4,109,235 A 8/1978 Bouthors
4,139,801 A 2/1979 Linares
4,151,526 A 4/1979 Hinachi et al.
4,214,266 A 7/1980 Myers
4,236,099 A 11/1980 Rosenblum
4,257,703 A 3/1981 Goodrich
4,258,979 A 3/1981 Mahin
4,277,804 A 7/1981 Robinson
4,286,308 A 8/1981 Wolff
4,310,851 A 1/1982 Pierrat
D266,501 S 10/1982 Stefanik
D266,758 S 11/1982 Johnnsen et al.
4,357,558 A 11/1982 Massoni et al.
4,376,909 A 3/1983 Tagami et al.
D272,656 S 2/1984 Parker
4,479,173 A 10/1984 Rumpakis
4,499,451 A 2/1985 Suzuki et al.
4,599,544 A 7/1986 Martin
4,638,287 A 1/1987 Umebayashi et al.
4,639,838 A 1/1987 Kato et al.
4,645,975 A 2/1987 Meitzler et al.
4,665,321 A 5/1987 Chang et al.
4,665,430 A 5/1987 Hiroyasu
4,692,798 A 9/1987 Seko et al.
4,716,298 A 12/1987 Etoh
4,727,290 A 2/1988 Smith et al.
4,740,838 A 4/1988 Mase et al.
4,768,135 A 8/1988 Kretschmer et al.
4,791,339 A 12/1988 Draz et al.
4,862,037 A 8/1989 Farber et al.
4,891,559 A 1/1990 Matsumoto et al.
4,910,591 A 3/1990 Petrossian et al.
4,930,742 A 6/1990 Schofield et al.
4,934,273 A 6/1990 Endriz
4,967,319 A 10/1990 Seko
5,005,213 A 4/1991 Hanson et al.
5,008,946 A 4/1991 Ando
5,027,200 A 6/1991 Petrossian et al.
5,036,437 A 7/1991 Macks
5,072,154 A 12/1991 Chen
5,086,253 A 2/1992 Lawler
5,096,287 A 3/1992 Kakinami et al.
5,121,200 A 6/1992 Choi et al.
5,124,549 A 6/1992 Michaels et al.
5,166,681 A 11/1992 Bottesch et al.
5,182,502 A 1/1993 Slotkowski et al.
5,187,383 A 2/1993 Taccetta et al.
5,197,562 A 3/1993 Kakinami et al.
5,230,400 A 7/1993 Kakinami et al.
5,235,178 A 8/1993 Hiegyi
5,243,417 A 9/1993 Pollard
5,289,321 A 2/1994 Secor
5,296,924 A 3/1994 Blancard et al.
5,304,980 A 4/1994 Maekawa
5,329,206 A 7/1994 Slotkowski et al.
D350,962 S 9/1994 Reardon et al.
5,347,261 A 9/1994 Adell
5,347,431 A 9/1994 Blackwell et al.
5,347,459 A 9/1994 Greenspan et al.
5,355,146 A 10/1994 Chiu et al.
5,379,104 A 1/1995 Takao
5,381,309 A 1/1995 Borchardt
5,386,285 A 1/1995 Asayama
5,396,054 A 3/1995 Krichever et al.
5,402,170 A 3/1995 Parulski et al.
5,408,357 A 4/1995 Beukema
5,414,461 A 5/1995 Kishi et al.
5,416,318 A 5/1995 Hegyi
5,418,610 A 5/1995 Fischer
5,424,952 A 6/1995 Asayama
5,426,294 A 6/1995 Kobayashi et al.
5,428,464 A 6/1995 Silverbrook
5,430,450 A 7/1995 Holmes
5,434,407 A 7/1995 Bauer et al.
5,451,822 A 9/1995 Bechtel et al.
5,452,004 A 9/1995 Roberts
5,469,298 A 11/1995 Suman et al.
5,471,515 A 11/1995 Fossum et al.
5,475,441 A 12/1995 Parulski et al.
5,475,494 A 12/1995 Nishida et al.
5,481,268 A 1/1996 Higgins
5,483,346 A 1/1996 Butzer
5,483,453 A 1/1996 Uemura et al.
5,485,155 A 1/1996 Hibino
5,485,378 A 1/1996 Franke et al.
5,488,496 A 1/1996 Pine
5,508,592 A 4/1996 Lapatovich et al.
5,515,244 A 5/1996 Levins et al.
5,515,448 A 5/1996 Nishitani
5,523,811 A 6/1996 Wada et al.
5,530,421 A 6/1996 Marshall et al.
5,535,144 A 7/1996 Kise
5,537,003 A 7/1996 Bechtel et al.
5,541,590 A 7/1996 Nishio
5,541,724 A 7/1996 Hoashi
5,550,677 A 8/1996 Schofield et al.
5,554,912 A 9/1996 Thayer et al.
5,574,443 A 11/1996 Hsieh
5,574,463 A 11/1996 Shirai et al.
5,576,975 A 11/1996 Sasaki et al.
5,587,929 A 12/1996 League et al.
5,592,146 A 1/1997 Kover, Jr. et al.
5,602,542 A 2/1997 Windmann et al.
5,614,788 A 3/1997 Mullins et al.
5,615,023 A 3/1997 Yang
5,617,085 A 4/1997 Tsutsumi et al.
5,621,460 A 4/1997 Hatlestad et al.
5,634,709 A 6/1997 Iwama
5,642,238 A 6/1997 Sala
5,646,614 A 7/1997 Abersfelder et al.
5,650,765 A 7/1997 Park
5,660,454 A 8/1997 Mori et al.
5,666,028 A 9/1997 Bechtel et al.
5,670,935 A 9/1997 Schofield et al.
5,680,123 A 10/1997 Lee
5,684,473 A 11/1997 Hibino et al.
5,707,129 A 1/1998 Kobayashi
5,708,410 A 1/1998 Blank et al.
5,708,857 A 1/1998 Ishibashi
5,710,565 A 1/1998 Shirai et al.
5,714,751 A 2/1998 Chen
5,715,093 A 2/1998 Schierbeek et al.
5,729,194 A 3/1998 Spears et al.
D393,185 S 4/1998 Chen
5,736,816 A 4/1998 Strenke et al.
5,745,050 A 4/1998 Nakagawa
5,751,211 A 5/1998 Shirai et al.
5,751,832 A 5/1998 Panter et al.
5,754,099 A 5/1998 Nishimura et al.
5,760,828 A 6/1998 Cortes
5,764,139 A 6/1998 Nojima et al.
5,767,793 A 6/1998 Agravante et al.
5,779,337 A 7/1998 Saito et al.
5,781,105 A 7/1998 Bitar et al.
5,786,787 A 7/1998 Eriksson et al.
5,792,147 A 8/1998 Evans et al.
5,793,308 A 8/1998 Rosinski et al.
5,793,420 A 8/1998 Schmidt
5,796,094 A 8/1998 Schofield et al.

(56) References Cited

U.S. PATENT DOCUMENTS

| | | | |
|---|---|---|---|
| 5,798,727 | A | 8/1998 | Shirai et al. |
| 5,811,888 | A | 9/1998 | Hsieh |
| 5,812,321 | A | 9/1998 | Schierbeek et al. |
| 5,825,527 | A | 10/1998 | Forgette et al. |
| 5,837,994 | A | 11/1998 | Stam et al. |
| 5,841,126 | A | 11/1998 | Fossum et al. |
| 5,844,505 | A | 12/1998 | Van Ryzin |
| 5,845,000 | A | 12/1998 | Breed et al. |
| 5,850,176 | A | 12/1998 | Kinoshita et al. |
| 5,857,770 | A | 1/1999 | Fohl et al. |
| 5,867,214 | A | 2/1999 | Anderson et al. |
| 5,877,897 | A | 3/1999 | Schofield et al. |
| 5,882,107 | A | 3/1999 | Bornhorst et al. |
| 5,883,605 | A | 3/1999 | Knapp |
| 5,883,739 | A | 3/1999 | Ashihara et al. |
| 5,896,119 | A | 4/1999 | Evanicky et al. |
| 5,904,729 | A | 5/1999 | Ruzicka |
| 5,905,457 | A | 5/1999 | Rashid |
| 5,912,534 | A | 6/1999 | Benedict |
| 5,923,027 | A | 7/1999 | Stam et al. |
| 5,935,613 | A | 8/1999 | Benham et al. |
| 5,940,011 | A | 8/1999 | Agravante et al. |
| 5,942,853 | A | 8/1999 | Piscart |
| 5,949,331 | A | 9/1999 | Schofield et al. |
| 5,956,079 | A | 9/1999 | Ridgley |
| 5,956,181 | A | 9/1999 | Lin |
| 5,959,555 | A | 9/1999 | Furuta |
| 5,990,469 | A | 11/1999 | Bechtel et al. |
| 6,002,983 | A | 12/1999 | Alland et al. |
| 6,005,724 | A | 12/1999 | Todd |
| 6,008,486 | A | 12/1999 | Stam et al. |
| 6,009,359 | A | 12/1999 | El-Hakim et al. |
| 6,018,308 | A | 1/2000 | Shirai |
| D421,016 | S | 2/2000 | Bowen et al. |
| 6,025,872 | A | 2/2000 | Ozaki et al. |
| 6,046,766 | A | 4/2000 | Sakata |
| 6,049,171 | A | 4/2000 | Stam et al. |
| 6,060,989 | A | 5/2000 | Gehlot |
| 6,061,002 | A | 5/2000 | Weber et al. |
| 6,067,111 | A | 5/2000 | Hahn et al. |
| 6,072,391 | A | 6/2000 | Suzuki et al. |
| 6,076,948 | A | 6/2000 | Bukosky et al. |
| 6,078,355 | A | 6/2000 | Zengel |
| 6,079,862 | A | 6/2000 | Kawashima et al. |
| 6,097,023 | A | 8/2000 | Schofield et al. |
| 6,102,546 | A | 8/2000 | Carter |
| 6,106,121 | A | 8/2000 | Buckley et al. |
| 6,111,498 | A | 8/2000 | Jobes et al. |
| 6,115,651 | A | 9/2000 | Cruz |
| 6,122,597 | A | 9/2000 | Saneyoshi et al. |
| 6,128,576 | A | 10/2000 | Nishimoto et al. |
| 6,130,421 | A | 10/2000 | Bechtel et al. |
| 6,130,448 | A | 10/2000 | Bauer et al. |
| 6,140,933 | A | 10/2000 | Bugno et al. |
| 6,144,158 | A | 11/2000 | Beam |
| 6,151,065 | A | 11/2000 | Steed et al. |
| 6,151,539 | A | 11/2000 | Bergholz et al. |
| 6,154,149 | A | 11/2000 | Tychkowski et al. |
| 6,157,294 | A | 12/2000 | Urai et al. |
| 6,166,629 | A | 12/2000 | Andreas |
| 6,166,698 | A | 12/2000 | Turnbull et al. |
| 6,167,755 | B1 | 1/2001 | Damson et al. |
| 6,170,956 | B1 | 1/2001 | Rumsey et al. |
| 6,172,600 | B1 | 1/2001 | Kakinami et al. |
| 6,172,601 | B1 | 1/2001 | Wada et al. |
| 6,175,300 | B1 | 1/2001 | Kendrick |
| 6,184,781 | B1 | 2/2001 | Ramakesavan |
| 6,185,492 | B1 | 2/2001 | Kagawa et al. |
| 6,191,704 | B1 | 2/2001 | Takenaga et al. |
| 6,200,010 | B1 | 3/2001 | Anders |
| 6,218,934 | B1 | 4/2001 | Regan |
| 6,222,447 | B1 | 4/2001 | Schofield et al. |
| 6,241,366 | B1 | 6/2001 | Roman et al. |
| 6,249,214 | B1 | 6/2001 | Kashiwazaki |
| 6,250,766 | B1 | 6/2001 | Strumolo et al. |
| 6,255,639 | B1 | 7/2001 | Stam et al. |
| 6,257,746 | B1 | 7/2001 | Todd et al. |
| 6,259,475 | B1 | 7/2001 | Ramachandran et al. |
| 6,265,968 | B1 | 7/2001 | Betzitza et al. |
| 6,268,803 | B1 | 7/2001 | Gunderson et al. |
| 6,269,308 | B1 | 7/2001 | Kodaka et al. |
| 6,281,632 | B1 | 8/2001 | Stam et al. |
| 6,281,804 | B1 | 8/2001 | Haller et al. |
| 6,289,332 | B2 | 9/2001 | Menig et al. |
| 6,300,879 | B1 | 10/2001 | Regan et al. |
| 6,304,173 | B2 | 10/2001 | Pala et al. |
| 6,313,892 | B2 | 11/2001 | Gleckman |
| 6,317,057 | B1 | 11/2001 | Lee |
| 6,320,612 | B1 | 11/2001 | Young |
| 6,324,295 | B1 | 11/2001 | Avionique et al. |
| 6,329,925 | B1 | 12/2001 | Skiver et al. |
| 6,330,511 | B2 | 12/2001 | Ogura et al. |
| 6,335,680 | B1 | 1/2002 | Matsuoka |
| 6,344,805 | B1 | 2/2002 | Yasui et al. |
| 6,346,698 | B1 | 2/2002 | Turnbull |
| 6,348,858 | B2 | 2/2002 | Weis et al. |
| 6,349,782 | B1 | 2/2002 | Sekiya et al. |
| 6,356,206 | B1 | 3/2002 | Takenaga et al. |
| 6,356,376 | B1 | 3/2002 | Tonar et al. |
| 6,357,883 | B1 | 3/2002 | Strumolo et al. |
| 6,357,893 | B1 | 3/2002 | Belliveau |
| 6,363,326 | B1 | 3/2002 | Scully |
| 6,369,701 | B1 | 4/2002 | Yoshida et al. |
| 6,379,013 | B1 | 4/2002 | Bechtel et al. |
| 6,396,040 | B1 | 5/2002 | Hill |
| 6,396,397 | B1 | 5/2002 | Bos et al. |
| D458,920 | S | 6/2002 | Kita |
| 6,403,942 | B1 | 6/2002 | Stam |
| 6,407,468 | B1 | 6/2002 | LeVesque et al. |
| 6,408,247 | B1 | 6/2002 | Ichikawa et al. |
| 6,412,959 | B1 | 7/2002 | Tseng |
| 6,415,230 | B1 | 7/2002 | Maruko et al. |
| 6,420,800 | B1 | 7/2002 | LeVesque et al. |
| 6,421,081 | B1 | 7/2002 | Markus |
| 6,424,272 | B1 | 7/2002 | Gutta et al. |
| 6,424,273 | B1 | 7/2002 | Gutta et al. |
| 6,424,892 | B1 | 7/2002 | Matsuoka |
| 6,428,172 | B1 | 8/2002 | Hutzel et al. |
| 6,433,680 | B1 | 8/2002 | Ho |
| 6,437,688 | B1 | 8/2002 | Kobayashi |
| 6,438,491 | B1 | 8/2002 | Farmer |
| 6,441,872 | B1 | 8/2002 | Ho |
| 6,442,465 | B2 | 8/2002 | Breed et al. |
| 6,443,585 | B1 | 9/2002 | Saccomanno |
| 6,443,602 | B1 | 9/2002 | Tanabe et al. |
| 6,447,128 | B1 | 9/2002 | Lang et al. |
| 6,452,533 | B1 | 9/2002 | Yamabuchi et al. |
| 6,463,369 | B2 | 10/2002 | Sadano et al. |
| 6,465,962 | B1 | 10/2002 | Fu et al. |
| 6,466,701 | B1 | 10/2002 | Ejiri et al. |
| 6,469,739 | B1 | 10/2002 | Bechtel et al. |
| 6,471,363 | B2 | 10/2002 | Howell et al. |
| 6,472,977 | B1 | 10/2002 | Pochmuller |
| 6,473,001 | B1 | 10/2002 | Blum |
| 6,473,554 | B1 | 10/2002 | Pelka et al. |
| 6,476,731 | B1 | 11/2002 | Miki et al. |
| 6,476,855 | B1 | 11/2002 | Yamamoto |
| 6,483,429 | B1 | 11/2002 | Yasui et al. |
| 6,483,438 | B2 | 11/2002 | Deline et al. |
| 6,487,500 | B2 | 11/2002 | Lemelson et al. |
| 6,491,416 | B1 | 12/2002 | Strazzanti |
| 6,498,620 | B2 | 12/2002 | Schofield et al. |
| 6,501,387 | B2 | 12/2002 | Skiver et al. |
| 6,507,779 | B2 | 1/2003 | Breed et al. |
| 6,515,581 | B1 | 2/2003 | Ho |
| 6,515,597 | B1 | 2/2003 | Wada et al. |
| 6,520,667 | B1 | 2/2003 | Mousseau |
| 6,522,969 | B2 | 2/2003 | Kannonji |
| 6,542,085 | B1 | 4/2003 | Yang |
| 6,542,182 | B1 | 4/2003 | Chutorash |
| 6,545,598 | B1 | 4/2003 | De Villeroche |
| 6,550,943 | B2 | 4/2003 | Strazzanti |
| 6,552,326 | B2 | 4/2003 | Turnbull |
| 6,553,130 | B1 | 4/2003 | Lemelson et al. |

(56) References Cited

U.S. PATENT DOCUMENTS

| | | | |
|---|---|---|---|
| 6,558,026 | B2 | 5/2003 | Strazzanti |
| 6,559,761 | B1 | 5/2003 | Miller et al. |
| 6,572,233 | B1 | 6/2003 | Northman et al. |
| 6,575,643 | B2 | 6/2003 | Takahashi |
| 6,580,373 | B1 | 6/2003 | Ohashi |
| 6,581,007 | B2 | 6/2003 | Hasegawa et al. |
| 6,583,730 | B2 | 6/2003 | Lang et al. |
| 6,587,573 | B1 | 7/2003 | Stam et al. |
| 6,591,192 | B2 | 7/2003 | Okamura et al. |
| 6,594,583 | B2 | 7/2003 | Ogura et al. |
| 6,594,614 | B2 | 7/2003 | Studt et al. |
| 6,611,202 | B2 | 8/2003 | Schofield et al. |
| 6,611,227 | B1 | 8/2003 | Nebiyeloul-Kifle |
| 6,611,610 | B1 | 8/2003 | Stam et al. |
| 6,611,759 | B2 | 8/2003 | Brosche |
| 6,614,387 | B1 | 9/2003 | Deadman |
| 6,616,764 | B2 | 9/2003 | Kramer et al. |
| 6,617,564 | B2 | 9/2003 | Ockerse et al. |
| 6,618,672 | B2 | 9/2003 | Sasaki et al. |
| 6,630,888 | B2 | 10/2003 | Lang et al. |
| 6,631,316 | B2 | 10/2003 | Stam et al. |
| 6,636,258 | B2 | 10/2003 | Strumolo |
| 6,642,840 | B2 | 11/2003 | Lang et al. |
| 6,642,851 | B2 | 11/2003 | Deline et al. |
| 6,648,477 | B2 | 11/2003 | Hutzel et al. |
| 6,657,767 | B2 | 12/2003 | Bonardi et al. |
| 6,665,592 | B2 | 12/2003 | Kodama |
| 6,670,207 | B1 | 12/2003 | Roberts |
| 6,670,910 | B2 | 12/2003 | Delcheccolo et al. |
| 6,674,370 | B2 | 1/2004 | Rodewald et al. |
| 6,675,075 | B1 | 1/2004 | Engelsberg et al. |
| 6,677,986 | B1 | 1/2004 | Pochmuller |
| 6,683,539 | B2 | 1/2004 | Trajkovic et al. |
| 6,683,969 | B1 | 1/2004 | Nishigaki et al. |
| 6,690,268 | B2 | 2/2004 | Schofield et al. |
| 6,690,413 | B1 | 2/2004 | Moore |
| 6,693,517 | B2 | 2/2004 | McCarty et al. |
| 6,693,518 | B2 | 2/2004 | Kumata |
| 6,693,519 | B2 | 2/2004 | Keirstead |
| 6,693,524 | B1 | 2/2004 | Payne |
| 6,717,610 | B1 | 4/2004 | Bos et al. |
| 6,727,808 | B1 | 4/2004 | Uselmann et al. |
| 6,727,844 | B1 | 4/2004 | Zimmermann et al. |
| 6,731,332 | B1 | 5/2004 | Yasui et al. |
| 6,734,807 | B2 | 5/2004 | King |
| 6,737,630 | B2 | 5/2004 | Turnbull |
| 6,737,964 | B2 | 5/2004 | Samman et al. |
| 6,738,088 | B1 | 5/2004 | Uskolovsky et al. |
| 6,744,353 | B2 | 6/2004 | Sjonell |
| 6,746,122 | B2 | 6/2004 | Knox |
| 6,749,325 | B2 | 6/2004 | Bukowsky et al. |
| 6,768,566 | B2 | 7/2004 | Walker |
| 6,772,057 | B2 | 8/2004 | Breed et al. |
| 6,774,988 | B2 | 8/2004 | Stam et al. |
| D496,633 | S | 9/2004 | Krause |
| 6,816,145 | B1 | 11/2004 | Evanicky |
| D500,384 | S | 12/2004 | Lyons et al. |
| 6,846,098 | B2 | 1/2005 | Bourdelais et al. |
| 6,847,487 | B2 | 1/2005 | Burgner |
| 6,853,413 | B2 | 2/2005 | Larson |
| 6,861,809 | B2 | 3/2005 | Stam |
| 6,870,655 | B1 | 3/2005 | Northman et al. |
| 6,902,307 | B2 | 6/2005 | Strazzanti |
| 6,912,001 | B2 | 6/2005 | Okamoto et al. |
| 6,913,375 | B2 | 7/2005 | Strazzanti |
| 6,918,685 | B2 | 7/2005 | Bukosky et al. |
| 6,923,080 | B1 | 8/2005 | Dobler et al. |
| 6,930,737 | B2 | 8/2005 | Weindorf et al. |
| 6,934,080 | B2 | 8/2005 | Saccomanno et al. |
| 6,946,978 | B2 | 9/2005 | Schofield |
| 7,008,091 | B2 | 3/2006 | Mathieu et al. |
| 7,012,543 | B2 | 3/2006 | Deline et al. |
| 7,018,085 | B2 | 3/2006 | Lee et al. |
| 7,038,577 | B2 | 5/2006 | Pawlicki et al. |
| 7,046,448 | B2 | 5/2006 | Burgner |
| 7,046,907 | B2 | 5/2006 | Miyashita |
| 7,050,908 | B1 | 5/2006 | Schwartz et al. |
| D524,761 | S | 7/2006 | Simmons et al. |
| 7,095,567 | B2 | 8/2006 | Troxell et al. |
| 7,104,676 | B2 | 9/2006 | Bukowsky et al. |
| D532,381 | S | 11/2006 | Valazquez |
| 7,175,291 | B1 | 2/2007 | Li |
| 7,192,172 | B1 | 3/2007 | Alberti |
| D539,944 | S | 4/2007 | Egawa et al. |
| 7,206,697 | B2 | 4/2007 | Olney et al. |
| 7,221,363 | B2 | 5/2007 | Roberts et al. |
| 7,224,472 | B2 | 5/2007 | Bauch et al. |
| 7,227,472 | B1 | 6/2007 | Roe |
| 7,241,037 | B2 | 7/2007 | Mathieu et al. |
| 7,245,231 | B2 | 7/2007 | Kiefer et al. |
| 7,255,465 | B2 | 8/2007 | Deline et al. |
| 7,262,406 | B2 | 8/2007 | Heslin et al. |
| 7,265,342 | B2 | 9/2007 | Heslin et al. |
| 7,273,307 | B2 | 9/2007 | Mathieu |
| 7,285,903 | B2 | 10/2007 | Cull et al. |
| 7,292,208 | B1 | 11/2007 | Park et al. |
| 7,302,344 | B2 | 11/2007 | Olney et al. |
| 7,306,355 | B2 | 12/2007 | Walser et al. |
| 7,311,428 | B2 | 12/2007 | Deline et al. |
| 7,317,386 | B2 | 1/2008 | Lengning et al. |
| 7,321,112 | B2 | 1/2008 | Stam et al. |
| 7,324,043 | B2 | 1/2008 | Purden et al. |
| 7,327,226 | B2 | 2/2008 | Turnbull et al. |
| 7,327,321 | B2 | 2/2008 | Todd et al. |
| 7,327,855 | B1 | 2/2008 | Chen |
| 7,331,415 | B2 | 2/2008 | Hawes et al. |
| 7,342,707 | B2 | 3/2008 | Roberts et al. |
| 7,349,582 | B2 | 3/2008 | Takeda et al. |
| 7,355,524 | B2 | 4/2008 | Schofield |
| 7,357,554 | B2 | 4/2008 | Weber et al. |
| 7,360,932 | B2 | 4/2008 | Uken et al. |
| 7,368,714 | B2 | 5/2008 | Remillard et al. |
| 7,369,736 | B2 | 5/2008 | Cha |
| 7,379,814 | B2 | 5/2008 | Ockerse et al. |
| 7,380,633 | B2 | 6/2008 | Shen et al. |
| 7,391,563 | B2 | 6/2008 | McCabe et al. |
| 7,416,318 | B2 | 8/2008 | Mathieu |
| 7,417,221 | B2 | 8/2008 | Creswick et al. |
| 7,427,150 | B2 | 9/2008 | Carter et al. |
| 7,446,650 | B2 | 11/2008 | Schofield et al. |
| 7,452,113 | B2 | 11/2008 | Newton et al. |
| 7,467,883 | B2 | 12/2008 | Deline et al. |
| 7,468,651 | B2 | 12/2008 | Deline et al. |
| 7,497,608 | B2 | 3/2009 | Wheatley et al. |
| 7,505,047 | B2 | 3/2009 | Yoshimura |
| D589,942 | S | 4/2009 | Wright |
| 7,533,998 | B2 | 5/2009 | Schofield et al. |
| 7,548,291 | B2 | 6/2009 | Lee et al. |
| 7,565,006 | B2 | 7/2009 | Stam et al. |
| 7,567,291 | B2 | 7/2009 | Bechtel et al. |
| 7,579,940 | B2 | 8/2009 | Schofield et al. |
| D603,081 | S | 10/2009 | Boyer et al. |
| 7,653,215 | B2 | 1/2010 | Stam |
| 7,653,486 | B2 | 1/2010 | Takahashi et al. |
| 7,658,521 | B2 | 2/2010 | Deline et al. |
| 7,683,326 | B2 | 3/2010 | Stam et al. |
| 7,706,683 | B2 | 4/2010 | Rossner et al. |
| 7,711,479 | B2 | 5/2010 | Taylor et al. |
| 7,719,408 | B2 | 5/2010 | Deward et al. |
| 7,720,580 | B2 | 5/2010 | Higgins-Luthman |
| 7,815,326 | B2 | 10/2010 | Blank et al. |
| 7,877,175 | B2 | 1/2011 | Higgins-Luthman |
| 7,881,839 | B2 | 2/2011 | Stam et al. |
| 7,888,629 | B2 | 2/2011 | Heslin et al. |
| 7,900,329 | B2 | 3/2011 | Chun |
| 7,914,188 | B2 | 3/2011 | Deline et al. |
| 7,942,565 | B2 | 5/2011 | Klick et al. |
| 7,944,371 | B2 | 5/2011 | Foote et al. |
| 7,972,045 | B2 | 7/2011 | Schofield |
| 7,982,823 | B1 | 7/2011 | Feng |
| 7,994,471 | B2 | 8/2011 | Heslin et al. |
| 8,031,225 | B2 | 10/2011 | Watanabe et al. |
| 8,045,760 | B2 | 10/2011 | Stam et al. |
| 8,058,977 | B2 | 11/2011 | Lynam |

(56) References Cited

U.S. PATENT DOCUMENTS

| | | | |
|---|---|---|---|
| 8,059,235 | B2 | 11/2011 | Utsumi et al. |
| 8,063,753 | B2 | 11/2011 | Deline et al. |
| 8,090,153 | B2 | 1/2012 | Schofield et al. |
| 8,100,568 | B2 | 1/2012 | Deline et al. |
| 8,111,444 | B2 | 2/2012 | Ko et al. |
| 8,116,929 | B2 | 2/2012 | Higgins-Luthman |
| 8,120,652 | B2 | 2/2012 | Bechtel et al. |
| 8,142,059 | B2 | 3/2012 | Higgins-Luthman et al. |
| 8,162,518 | B2 | 4/2012 | Schofield |
| 8,169,307 | B2 | 5/2012 | Nakamura et al. |
| 8,201,800 | B2 | 6/2012 | Filipiak |
| 8,203,433 | B2 | 6/2012 | Deuber et al. |
| 8,217,830 | B2 | 7/2012 | Lynam |
| 8,222,588 | B2 | 7/2012 | Schofield et al. |
| 8,237,909 | B2 | 8/2012 | Ostreko et al. |
| 8,258,433 | B2 | 9/2012 | Byers et al. |
| 8,282,226 | B2 | 10/2012 | Blank et al. |
| D670,660 | S | 11/2012 | Cook |
| 8,325,028 | B2 | 12/2012 | Schofield et al. |
| D679,853 | S | 4/2013 | Chiou et al. |
| 8,482,683 | B2 | 7/2013 | Hwang et al. |
| D695,435 | S | 12/2013 | Pedersen |
| D697,036 | S | 1/2014 | Kay et al. |
| 8,736,548 | B2 | 5/2014 | Pryor |
| 8,817,085 | B2 | 8/2014 | Hiltl et al. |
| 8,905,585 | B2 | 12/2014 | Dallam et al. |
| D726,950 | S | 4/2015 | Serwacki et al. |
| 9,028,119 | B2 | 5/2015 | Lisowski et al. |
| 9,222,257 | B2 | 12/2015 | Dallam et al. |
| 9,355,580 | B2 | 5/2016 | Zommer et al. |
| 9,403,478 | B2 | 8/2016 | Lisowski et al. |
| D785,845 | S | 5/2017 | Lazalier et al. |
| D809,188 | S | 1/2018 | Li |
| 10,012,369 | B1 | 7/2018 | Wang |
| D826,444 | S | 8/2018 | Van Berkel et al. |
| D827,171 | S | 8/2018 | Van Berkel et al. |
| D827,172 | S | 8/2018 | Van Berkel et al. |
| D827,173 | S | 8/2018 | Van Berkel et al. |
| 10,231,607 | B2 | 3/2019 | Charles et al. |
| D858,846 | S | 9/2019 | Flugel et al. |
| D861,269 | S | 9/2019 | Thompson et al. |
| D886,358 | S | 6/2020 | Silver |
| D893,090 | S | 8/2020 | McClow et al. |
| D903,922 | S | 12/2020 | Arsenault et al. |
| 11,231,141 | B2 | 1/2022 | Fujisawa |
| D945,975 | S | 3/2022 | Abramson |
| 2001/0019356 | A1 | 9/2001 | Takeda et al. |
| 2001/0022616 | A1 | 9/2001 | Rademacher et al. |
| 2001/0026316 | A1 | 10/2001 | Senatore |
| 2001/0029416 | A1 | 10/2001 | Breed et al. |
| 2001/0045981 | A1 | 11/2001 | Gloger et al. |
| 2002/0040962 | A1 | 4/2002 | Schofield et al. |
| 2002/0044065 | A1 | 4/2002 | Quist et al. |
| 2002/0080463 | A1 | 6/2002 | Tonar et al. |
| 2002/0171954 | A1 | 11/2002 | Bonardi et al. |
| 2002/0191127 | A1 | 12/2002 | Roberts et al. |
| 2003/0002165 | A1 | 1/2003 | Mathias et al. |
| 2003/0007261 | A1 | 1/2003 | Hutzel et al. |
| 2003/0016125 | A1 | 1/2003 | Lang et al. |
| 2003/0016287 | A1 | 1/2003 | Nakayama et al. |
| 2003/0025596 | A1 | 2/2003 | Lang et al. |
| 2003/0025597 | A1 | 2/2003 | Schofield |
| 2003/0030546 | A1 | 2/2003 | Tseng |
| 2003/0030551 | A1 | 2/2003 | Ho |
| 2003/0030724 | A1 | 2/2003 | Okamoto |
| 2003/0035050 | A1 | 2/2003 | Mizusawa |
| 2003/0043269 | A1 | 3/2003 | Park |
| 2003/0052969 | A1 | 3/2003 | Satoh et al. |
| 2003/0058338 | A1 | 3/2003 | Kawauchi et al. |
| 2003/0067383 | A1 | 4/2003 | Yang |
| 2003/0076415 | A1 | 4/2003 | Strumolo |
| 2003/0080877 | A1 | 5/2003 | Takagi et al. |
| 2003/0085806 | A1 | 5/2003 | Samman et al. |
| 2003/0088361 | A1 | 5/2003 | Sekiguchi |
| 2003/0090568 | A1 | 5/2003 | Pico |
| 2003/0090569 | A1 | 5/2003 | Poechmueller |
| 2003/0090570 | A1 | 5/2003 | Takagi et al. |
| 2003/0098908 | A1 | 5/2003 | Misaiji et al. |
| 2003/0103141 | A1 | 6/2003 | Bechtel et al. |
| 2003/0103142 | A1 | 6/2003 | Hitomi et al. |
| 2003/0117522 | A1 | 6/2003 | Okada |
| 2003/0122929 | A1 | 7/2003 | Minaudo et al. |
| 2003/0122930 | A1 | 7/2003 | Schofield et al. |
| 2003/0133014 | A1 | 7/2003 | Mendoza |
| 2003/0137586 | A1 | 7/2003 | Lewellen |
| 2003/0141965 | A1 | 7/2003 | Gunderson et al. |
| 2003/0146831 | A1 | 8/2003 | Berberich et al. |
| 2003/0169158 | A1 | 9/2003 | Paul, Jr. |
| 2003/0179293 | A1 | 9/2003 | Oizumi |
| 2003/0202096 | A1 | 10/2003 | Kim |
| 2003/0202357 | A1 | 10/2003 | Strazzanti |
| 2003/0214576 | A1 | 11/2003 | Koga |
| 2003/0214584 | A1 | 11/2003 | Ross, Jr. |
| 2003/0214733 | A1 | 11/2003 | Fujikawa et al. |
| 2003/0222793 | A1 | 12/2003 | Tanaka et al. |
| 2003/0222983 | A1 | 12/2003 | Nobori et al. |
| 2003/0227546 | A1 | 12/2003 | Hilborn et al. |
| 2004/0004541 | A1 | 1/2004 | Hong |
| 2004/0027695 | A1 | 2/2004 | Lin |
| 2004/0032321 | A1 | 2/2004 | McMahon et al. |
| 2004/0036768 | A1 | 2/2004 | Green |
| 2004/0051634 | A1 | 3/2004 | Schofield et al. |
| 2004/0056955 | A1 | 3/2004 | Berberich et al. |
| 2004/0057131 | A1 | 3/2004 | Hutzel et al. |
| 2004/0064241 | A1 | 4/2004 | Sekiguchi |
| 2004/0070857 | A1 | 4/2004 | Bonardi et al. |
| 2004/0075603 | A1 | 4/2004 | Kodama |
| 2004/0080404 | A1 | 4/2004 | White |
| 2004/0080431 | A1 | 4/2004 | White |
| 2004/0085196 | A1 | 5/2004 | Miller et al. |
| 2004/0090314 | A1 | 5/2004 | Iwamoto |
| 2004/0090317 | A1 | 5/2004 | Rothkop |
| 2004/0096082 | A1 | 5/2004 | Nakai et al. |
| 2004/0098196 | A1 | 5/2004 | Sekiguchi |
| 2004/0107030 | A1 | 6/2004 | Nishira et al. |
| 2004/0107617 | A1 | 6/2004 | Shoen et al. |
| 2004/0109060 | A1 | 6/2004 | Ishii |
| 2004/0114039 | A1 | 6/2004 | Ishikura |
| 2004/0119668 | A1 | 6/2004 | Homma et al. |
| 2004/0125905 | A1 | 7/2004 | Vlasenko et al. |
| 2004/0202001 | A1 | 10/2004 | Roberts et al. |
| 2004/0217266 | A1 | 11/2004 | Bechtel et al. |
| 2005/0140855 | A1 | 6/2005 | Utsumi |
| 2005/0237440 | A1 | 10/2005 | Sugimura et al. |
| 2005/0264891 | A1 | 12/2005 | Uken et al. |
| 2005/0276058 | A1 | 12/2005 | Romas et al. |
| 2006/0007550 | A1 | 1/2006 | Tonar et al. |
| 2006/0115759 | A1 | 6/2006 | Kim et al. |
| 2006/0139953 | A1 | 6/2006 | Chou et al. |
| 2006/0146555 | A1 | 7/2006 | Inaba |
| 2006/0158899 | A1 | 7/2006 | Ayabe et al. |
| 2007/0171037 | A1 | 7/2007 | Schofield et al. |
| 2008/0068520 | A1 | 3/2008 | Minikey, Jr. et al. |
| 2008/0177569 | A1 | 7/2008 | Chen et al. |
| 2008/0192132 | A1 | 8/2008 | Bechtel et al. |
| 2008/0212215 | A1 | 9/2008 | Schofield et al. |
| 2008/0247192 | A1 | 10/2008 | Hoshi et al. |
| 2008/0256494 | A1 | 10/2008 | Greenfield |
| 2008/0294315 | A1 | 11/2008 | Breed |
| 2009/0015736 | A1 | 1/2009 | Weller et al. |
| 2009/0085729 | A1 | 4/2009 | Nakamura et al. |
| 2009/0103183 | A1 | 4/2009 | Deline et al. |
| 2009/0141516 | A1 | 6/2009 | Wu et al. |
| 2009/0261759 | A1 | 10/2009 | Fornasiero |
| 2010/0168763 | A1 | 7/2010 | Zhao et al. |
| 2010/0182143 | A1 | 7/2010 | Lynam |
| 2010/0201896 | A1 | 8/2010 | Ostreko et al. |
| 2010/0278480 | A1 | 11/2010 | Vasylyev |
| 2011/0037840 | A1 | 2/2011 | Hiltl et al. |
| 2011/0254922 | A1 | 10/2011 | Schaerer et al. |
| 2011/0261568 | A1 | 10/2011 | Dalsgaard |
| 2012/0012741 | A1 | 1/2012 | Vasylyev |
| 2012/0033441 | A1 | 2/2012 | Sousek et al. |

(56) References Cited

U.S. PATENT DOCUMENTS

| | | | | |
|---|---|---|---|---|
| 2012/0043910 | A1* | 2/2012 | Nagashima | H05B 45/20 315/294 |
| 2012/0092591 | A1 | 4/2012 | Zheng et al. | |
| 2012/0099325 | A1 | 4/2012 | Ghosh et al. | |
| 2012/0099335 | A1 | 4/2012 | Boehland et al. | |
| 2012/0206050 | A1 | 8/2012 | Spero | |
| 2013/0028473 | A1 | 1/2013 | Hilldore et al. | |
| 2013/0094215 | A1 | 4/2013 | Jurik et al. | |
| 2013/0249791 | A1 | 9/2013 | Pryor | |
| 2013/0279014 | A1 | 10/2013 | Fish, Jr. et al. | |
| 2014/0015948 | A1 | 1/2014 | Tam et al. | |
| 2014/0140081 | A1 | 5/2014 | Takahashi et al. | |
| 2014/0177249 | A1 | 6/2014 | Iseki et al. | |
| 2014/0177258 | A1 | 6/2014 | Gebhard et al. | |
| 2014/0185310 | A1 | 7/2014 | Lisowski et al. | |
| 2014/0347488 | A1 | 11/2014 | Tazaki et al. | |
| 2015/0036371 | A1 | 2/2015 | Ichikawa et al. | |
| 2016/0078768 | A1 | 3/2016 | Huizen et al. | |
| 2017/0074488 | A1* | 3/2017 | Fujisawa | F21S 8/04 |
| 2017/0089541 | A1 | 3/2017 | Nakajima et al. | |
| 2017/0180720 | A1 | 6/2017 | Jarc | |
| 2017/0296290 | A1 | 10/2017 | Nieminen | |
| 2017/0318644 | A1 | 11/2017 | Hartl et al. | |
| 2017/0367785 | A1 | 12/2017 | Munari | |
| 2018/0008154 | A1 | 1/2018 | Riley et al. | |
| 2018/0111265 | A1 | 4/2018 | DelSpina | |
| 2019/0060026 | A1 | 2/2019 | Geerlings et al. | |
| 2019/0117318 | A1 | 4/2019 | Charron et al. | |
| 2019/0117809 | A1 | 4/2019 | Katz | |
| 2019/0282307 | A1 | 9/2019 | Azizian et al. | |
| 2019/0338922 | A1 | 11/2019 | Jurik et al. | |
| 2019/0368702 | A1* | 12/2019 | Sousa | F21V 21/15 |
| 2020/0408391 | A1* | 12/2020 | Maghnagi | F21V 21/26 |
| 2021/0108783 | A1 | 4/2021 | Hallack et al. | |
| 2021/0192759 | A1 | 6/2021 | Lang | |
| 2022/0325883 | A1 | 10/2022 | Jurik et al. | |

FOREIGN PATENT DOCUMENTS

| | | | | |
|---|---|---|---|---|
| CN | 106815487 | A | 6/2017 | |
| CN | 107799171 | A | 3/2018 | |
| DE | M9406080-0002 | | 1/1995 | |
| DE | 19803403 | A1 | 8/1999 | |
| DE | 19808393 | A1 | 9/1999 | |
| DE | 102005031023 | B3 | 1/2007 | |
| DE | 102019200009 | A1 * | 7/2019 | F21S 8/02 |
| EP | 0513476 | | 11/1992 | |
| EP | 0899157 | B1 | 10/2004 | |
| EP | 000809686-0001 | | 11/2007 | |
| EP | 1970736 | A1 | 9/2008 | |
| EP | 2215987 | A1 | 8/2010 | |
| EP | 2431657 | A2 | 3/2012 | |
| EP | 2618042 | A2 | 7/2013 | |
| GB | 2338363 | | 12/1999 | |
| JP | 5226076 | A | 9/1993 | |
| JP | 681836 | | 3/1997 | |
| JP | 10091102 | A | 4/1998 | |
| JP | 10285496 | A | 10/1998 | |
| JP | 1178695 | | 3/1999 | |
| JP | 3070845 | B1 | 7/2000 | |
| JP | 2001134700 | A | 5/2001 | |
| JP | 2002169940 | A | 6/2002 | |
| JP | 2002200936 | A | 7/2002 | |
| JP | 2002225629 | A | 8/2002 | |
| JP | 2005148119 | | 6/2005 | |
| JP | 2005520298 | A | 7/2005 | |
| JP | 2005247076 | A | 9/2005 | |
| JP | 2005327600 | | 11/2005 | |
| JP | 2006156138 | A | 6/2006 | |
| JP | 2007519549 | A | 7/2007 | |
| JP | 2008139819 | A | 6/2008 | |
| JP | 2008230558 | A | 10/2008 | |
| JP | 2010501088 | A | 1/2010 | |
| JP | 2010198859 | A | 9/2010 | |
| JP | 2013161656 | A | 8/2013 | |
| JP | 3188754 | U | 2/2014 | |
| JP | 2015204232 | A | 11/2014 | |
| JP | 2014234022 | A | 12/2014 | |
| JP | HJ2904008200 | | 11/2017 | |
| JP | 2021512734 | A | 5/2021 | |
| KR | 20020010125 | A | 2/2002 | |
| KR | 20070007287 | A | 1/2007 | |
| KR | 20090031998 | A | 3/2009 | |
| KR | 20160007700 | A | 1/2016 | |
| KR | 20180057447 | A | 5/2018 | |
| KR | 1020200082997 | A | 7/2020 | |
| WO | 9621581 | | 7/1996 | |
| WO | 199735743 | | 10/1997 | |
| WO | 2000035402 | | 6/2000 | |
| WO | 2007103573 | A2 | 9/2007 | |
| WO | 2010090964 | | 8/2010 | |
| WO | 2011048311 | A2 | 4/2011 | |
| WO | 2012172383 | A1 | 12/2012 | |
| WO | 213111134 | A1 | 8/2013 | |
| WO | 2017174903 | A1 | 10/2017 | |
| WO | 2019175757 | A1 | 9/2019 | |

OTHER PUBLICATIONS

Defauw, Randall et al., "A system for Small Target Detection, Tracking and Classification," IEEE, 1999, pp. 639-644.

Gorman, R. Paul et al., "Learned Classification of Sonar Targets Using a Massively Parallel Network," IEEE, 1988, 6 pages.

Mohan, Anuj et al., "Example-Based Object Detection in Images by Components," IEEE, vol. 23, No. 4, 2001, pp. 349-361.

Palalau et al., "FPD Evaluation for Automotive Application," Proceedings of the Vehicle Display Symposium, Nov. 2, 1995, pp. 97-103, Society for Information Display, Detroit Chapter, Santa Ana, CA.

Adler, "A New Automotive AMLCD Module," Proceedings of the Vehicle Display Symposium, Nov. 2, 1995, pp. 67-71, Society for Information Display, Detroit Chapter, Santa Ana, CA.

Sayer, et al., "In-Vehicle Displays for Crash Avoidance and Navigation Systems,"Proceedings of the Vehicle Display Symposium, Sep. 18, 1996, pp. 39-42, Society for Information Display, Detroit Chapter, Santa Ana, CA.

Knoll, et al., "Application of Graphic Displays in Automobiles," SID 87 Digest, 1987, pp. 41-44, 5A.2.

Terada, et al., "Development of Central Information Display of Automotive Application," SID 89 Digest, 1989, pp. 192-195, Society for Information Display, Detroit Center, Santa Ana, CA.

Thomsen, et al., "AMLCD Design Considerations for Avionics and Vetronics Applications," Proceedings of the 5th Annual Flat Panel Display Strategic and Technical Symposium, Sep. 9-10, 1998, pp. 139-145, Society for Information Display, Metropolitan Detroit Chapter, CA.

Knoll, et al., "Conception of an Integrated Driver Information System," SID International Symposium Digest of Technical Papers, 1990, pp. 126-129, Society for Information Display, Detroit Center, Santa Ana, CA.

Vincen, "An Analysis of Direct-View FPDs for Automotive Multi-Media Applications,"Proceedings of the 6th Annual Strategic and Technical Symposium "Vehicular Applications of Displays and Microsensors," Sep. 22-23, 1999, pp. 39-46, Society for Information Display, Metropolitan Detroit Chapter, San Jose, CA.

Zuk, et al., "Flat Panel Display Applications in Agriculture Equipment," Proceedings of the 5th Annual Flat Panel Display Strategic and Technical Symposium, Sep. 9-10, 1998, pp. 125-130, Society for Information Display, Metropolitan Detroit Chapter, CA.

Vijan, et al., "A 1.7-Mpixel Full-Color Diode Driven AM-LCD," SID International Symposium, 1990, pp. 530-533, Society for Information Display, Playa del Rey, CA.

Vincen, "The Automotive Challenge to Active Matrix LCD Technology," Proceedings of the Vehicle Display Symposium, 1996, pp. 17-21, Society for Information Display, Detroit Center, Santa Ana, CA.

(56) References Cited

OTHER PUBLICATIONS

Corsi, et al., "Reconfigurable Displays Used as Primary Automotive Instrumentation," SAE Technical Paper Series, 1989, pp. 13-18, Society of Automotive Engineers, Inc., Warrendale, PA.
Schumacher, "Automotive Display Trends," SID 96 Digest, 1997, pp. 1-6, Delco Electronics Corp., Kokomo, IN.
Knoll, "The Use of Displays in Automotive Applications," Journal of the SID 5/3 1997, pp. 165-172, 315-316, Stuttgart, Germany.
Donofrio, "Looking Beyond the Dashboard," SID 2002, pp. 30-34, Ann Arbor, MI.
Stone, "Automotive Display Specification," Proceedings of the Vehicle Display Symposium, 1995, pp. 93-96, Society for Information Display, Detroit Center, Santa Ana, CA.

* cited by examiner

LIGHTING ASSEMBLY AND ILLUMINATION SYSTEM HAVING A LIGHTING ASSEMBLY

CROSS-REFERENCE TO RELATED APPLICATION

This application is a continuation application of U.S. patent application Ser. No. 17/891,358 filed on Aug. 19, 2022, entitled "LIGHTING ASSEMBLY AND ILLUMINATION SYSTEM HAVING A LIGHTING ASSEMBLY," now U.S. Pat. No. 11,994,272, which claims priority to and the benefit under 35 U.S.C. § 119 (e) of U.S. Provisional Application No. 63/235,384, filed on Aug. 20, 2021, entitled "LIGHTING ASSEMBLY," the disclosure of which is hereby incorporated herein by reference in its entirety.

FIELD OF THE DISCLOSURE

The present disclosure generally relates to a lighting assembly, and more particularly to a lighting assembly where dynamic lighting solutions may be advantageous, which may include surgical theatres and medical suites.

BACKGROUND OF THE DISCLOSURE

Artificial lighting provided in surgical theaters and medical suites may present a number of issues with regard to positioning, shadows, luminosity, glare, and also cleaning. Often, medical professionals are not stationary and the lighting needs to be dynamic due to the shifting of personnel and instruments throughout a surgical procedure. Lighting may be suspended from the ceiling in the presence of other medical equipment such as hoses, monitor stands, booms, imaging equipment, air handlers, etc. Accordingly, illumination systems for surgical suites that adapt to these obstacles are advantageous.

SUMMARY OF THE DISCLOSURE

According to one aspect of the present disclosure, a lighting assembly includes an upper mount and a lower mount coupled with the upper mount. A central shaft is coupled between the upper and lower mounts and configured to rotate the lower mount relative to the upper mount. A printed circuit board includes a proximity sensor and defines a central aperture. The central shaft extends through the central aperture. An actuator ring is disposed around and rotatable with the central shaft. The proximity sensor is configured to detect a position of the actuator ring to indicate a position of the lower mount relative to the upper mount.

According to another aspect of the present disclosure, a lighting assembly includes an upper mount and a lower mount coupled and configured to rotate relative to the upper mount. At least one indicator flange is operably coupled to one of the lower mount and the upper mount. A printed circuit board is operably coupled to a different one of the lower mount and the upper mount than the at least one indicator flange and includes a plurality of sensors. The plurality of sensors are selectively engaged with the at least one indicator flange during relative rotation. A controller is operably coupled to the printed circuit board and configured to determine a position of the lower mount relative to the upper mount based on the selective engagement between the at least one indicator flange and the plurality of sensors.

According to another aspect of the present disclosure, a lighting assembly includes an upper mount and a lower mount coupled and configured to rotate relative to the upper mount with a first drive gear. A light module is coupled to the lower mount and includes a second drive gear configured to tilt the light module relative to the lower mount. At least one sensor is configured to detect a position of the lower mount relative to the upper mount. A controller is operably coupled to the at least one sensor, the first drive gear, and the second drive gear. The controller is configured to rotate the lower mount and the light module via the first drive gear, tilt the light module via the second drive gear, and determine the position of the lower mount relative to the upper mount via the at least one sensor.

According to another aspect of the present disclosure, an illumination system that includes at least one air handler unit and a housing that is operably coupled to the at least one air handler unit. The housing defines a cavity and includes a transparent panel selectively removable from the housing. The transparent panel is configured to provide access to the cavity, and a lighting assembly is disposed within the cavity of the housing. A light module is proximate to the transparent panel.

According to another aspect of the present disclosure, an advanced lighting system provides better lighting for medical staff when treating a patient. The advanced lighting system can be rotated and tilted to maximize the lighting angles relative to the patient. Each lighting assembly can be individually adjusted via rotation and tilting to personalize and provide fine-tuned directional lighting.

These and other features, advantages, and objects of the present disclosure will be further understood and appreciated by those skilled in the art by reference to the following specification, claims, and appended drawings.

DETAILED DESCRIPTION

Figure 1:
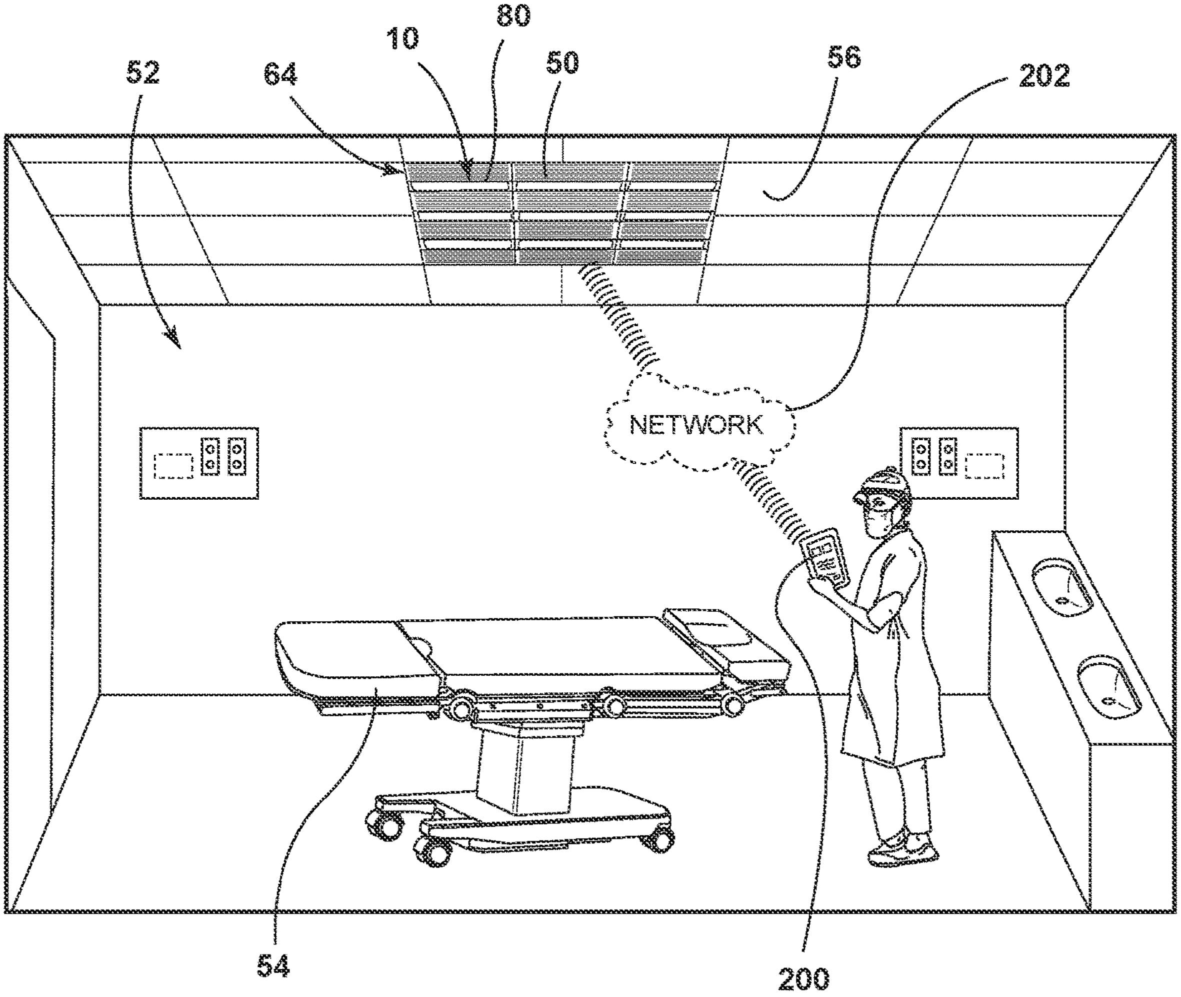
FIG. 1 is a side perspective view of an illumination system of the present disclosure within a surgical suite.

The present illustrated embodiments reside primarily in combinations of method steps and apparatus components related to a lighting assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-14, reference numeral 10 generally designates a lighting assembly. The lighting assembly 10 includes an upper mount 12 that has a pan gear 14 and a plurality of indicator flanges 16. A lower mount 20 is operably coupled to the upper mount 12 and includes a pan motor 22 and a tilt motor 24. A printed circuit board 28 is operably coupled to the lower mount 20 and includes a plurality of sensors 30. At least one sensor 30 is selectively and operably coupled with the plurality of indicator flanges 16 of the upper mount 12. A light module 32 is operably coupled to the lower mount 20, and the light module 32 includes a tilt gear 34 that is operably coupled to the lower mount 20. A controller 36 is operably coupled to the printed circuit board 28, the pan motor 22, and the tilt motor 24. The controller 36 is configured to rotate the lower mount 20 and the light module 32 via the pan motor 22 and is configured to tilt the light module 32 via the tilt motor 24.

Referring to FIGS. 1-4, the lighting assembly 10 is illustrated as being coupled to an air handler unit 50 within a surgical suite 52 above a surgical table 54. It is generally contemplated that the lighting assembly 10 may be utilized in other environmental settings including, but not limited to, surgical suites, hospital rooms, medical examination rooms, and other settings in which the lighting assembly 10 may be advantageously utilized. It is generally contemplated that the air handler unit 50 may be one of a plurality of air handler units 50 that may define at least a portion of a ceiling 56 within the surgical suite 52. Stated differently, the lighting assembly 10 is operably coupled to at least one air handler unit 50 within the surgical suite 52. The air handler unit 50 is configured to provide ambient light within the surgical suite 52 and filter the airflow within the surgical suite 52 to define a positive pressure environment around the surgical table 54. The air handler unit 50 defines the positive pressure environment by pushing air down toward the surgical table 54 and away from the surgical table 54. The air handler units 50 may at least partially define a grid pattern along the ceiling 56 of the surgical suite 52.

Figure 2:
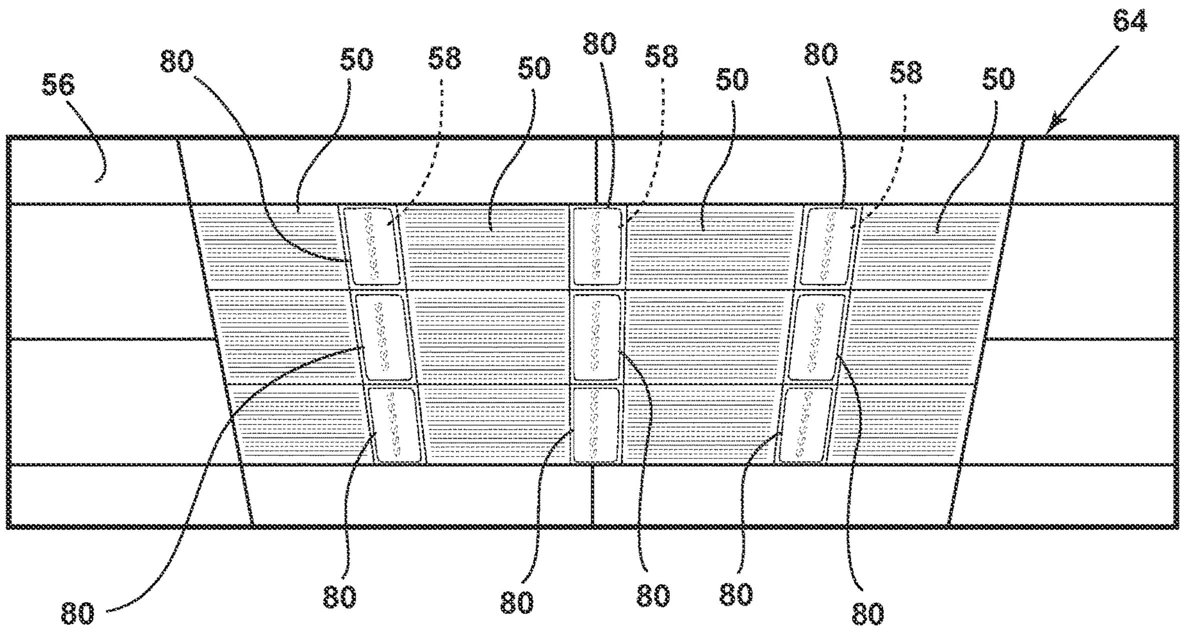
FIG. 2 is an enlarged partial perspective view of the illumination system of FIG. 1 with air handler units and lighting arrays.
Figure 3:
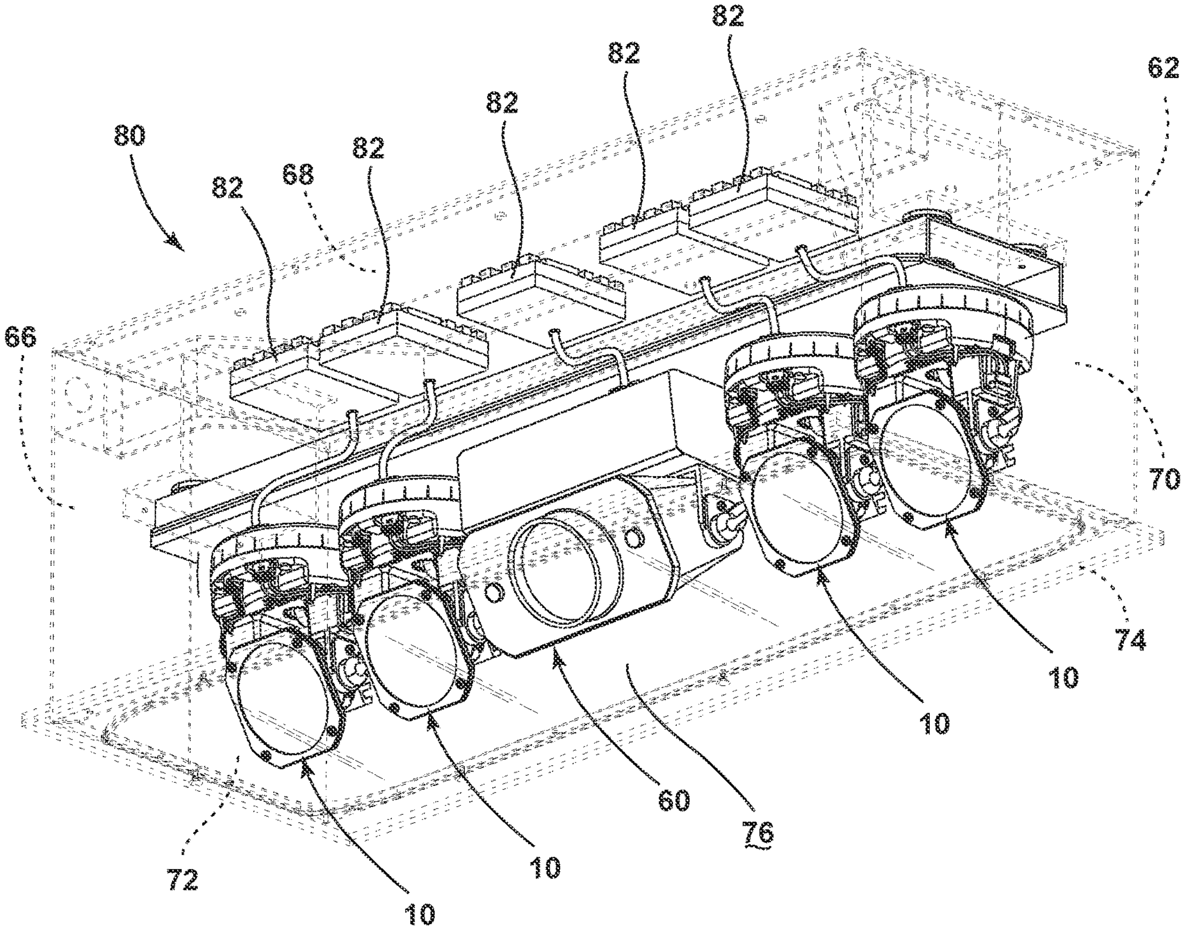
FIG. 3 is a bottom perspective view of a lighting array of the present disclosure.
Figure 4:
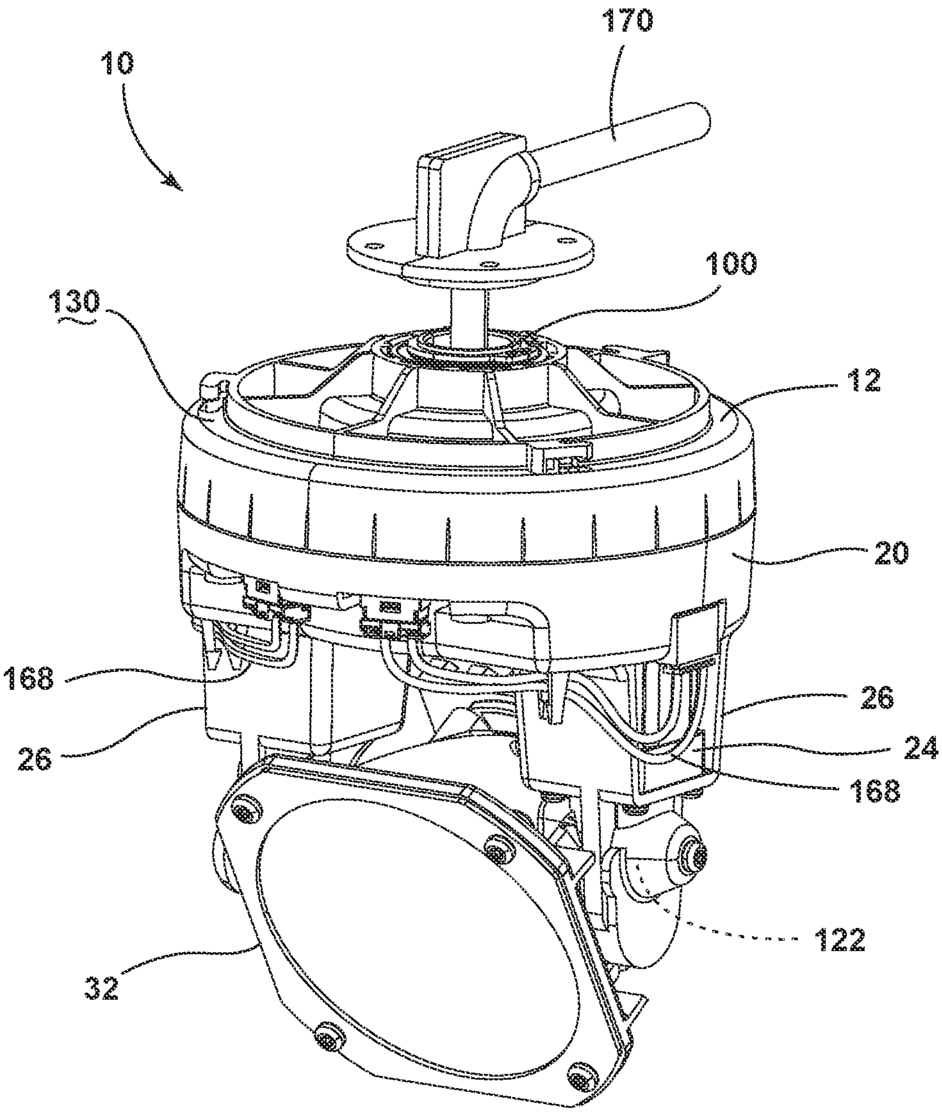
FIG. 4 is a side perspective view of a single lighting assembly of the present disclosure with an upper mount, a lower mount, and a light module.

As illustrated in FIG. 2, gaps 58 in which the lighting assembly 10 can be disposed may be defined between each air handler unit 50. By way of example, and not limitation, three linear gaps 58 are illustrated as being defined between the air handler units 50. The lighting assembly 10 may be disposed within each one of the three linear gaps 58 to provide lighting above the surgical table 54. It is generally contemplated that at least one of the lighting assemblies 10 positioned within the central gap **58*a* includes at least one imaging device 60, such as a camera or other vision-based device, and is configured to record or otherwise document activity within the surgical suite 52 relative to the surgical table 54. It is also contemplated that the imaging device 60 can be directed toward the surgical table 54 and communicative coupled with the controller 36 (FIG. 12) to define a three-dimensional map of the surgical suite 52. The controller 36 may adjust the position of the lighting assemblies 10 based on the three-dimensional map generated by the imaging device 60. For example, it is contemplated that the imaging device 60 and the controller 36 may cooperate to minimize shadows and potential lighting blockages proximate to the surgical table 54. In some examples, the controller 36 is configured to communicate an instruction to adjust the lighting assembly 10 based on images captured by the imaging device 60**.

Figure 12:
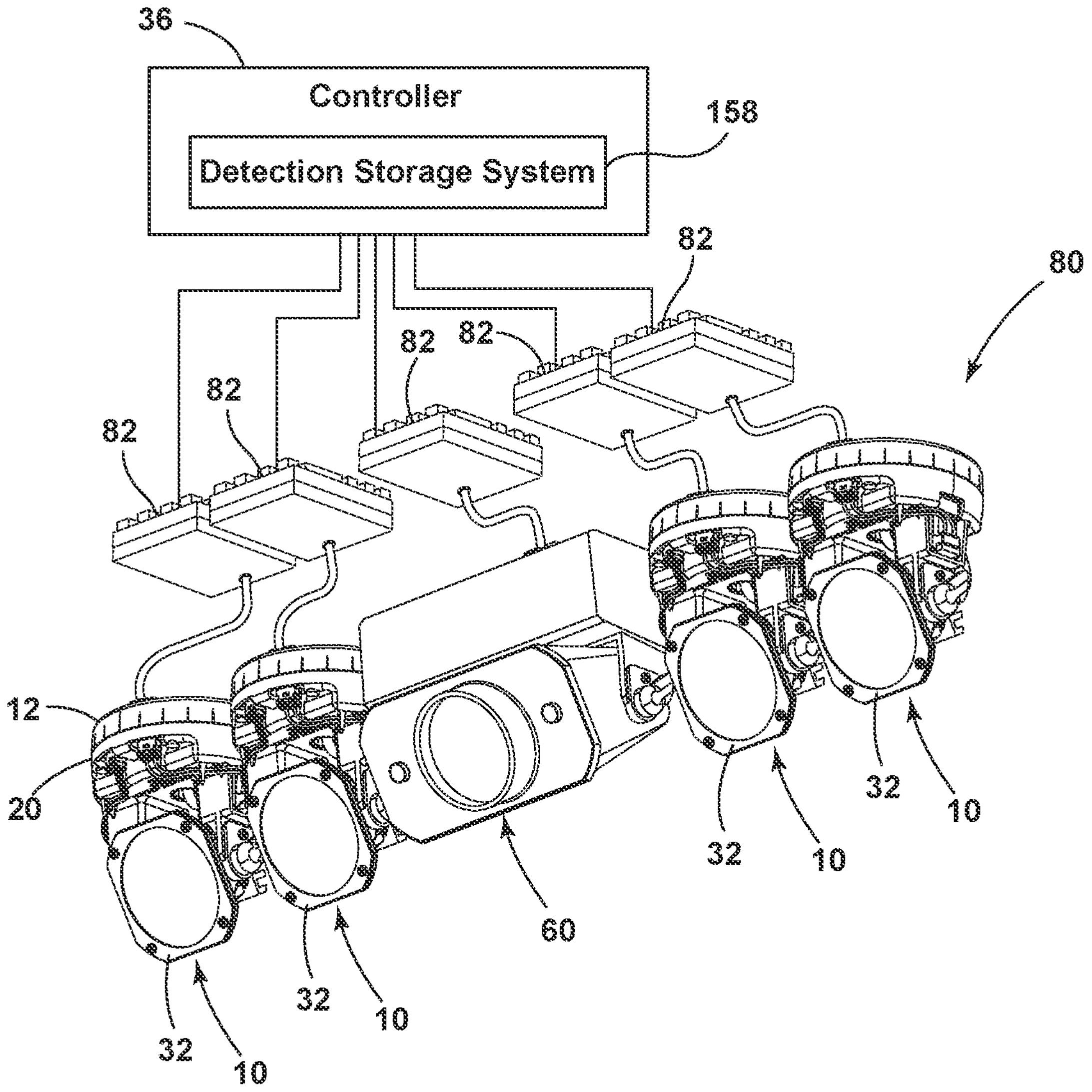
FIG. 12 is a bottom perspective view of a lighting array of the present disclosure coupled to a controller with a detection storage system.

For example, multiple lighting assemblies 10 may include the imaging device 60, which may provide a comprehensive view of the position of each respective lighting assembly 10 relative to the surgical table 54. It is generally contemplated that the imaging device 60 may be disposed within a housing 62 along with the lighting assemblies 10. The imaging device 60 may be operable via the controller 36 (FIG. 12) with which the imaging device 60 is communicatively coupled as well as surrounding lighting assemblies 10. Stated differently, the imaging device 60 may be communicatively coupled with the controller 36 (FIG. 12).

With further reference to FIGS. 1-4, the lighting assembly 10 is disposed within the housing 62 that is operably coupled to and positioned between the air handler units 50. It is generally contemplated that the air handler units 50, the housing 62, and the lighting assembly 10 may be collectively defined as an illumination system 64, described further herein. The housing 62 may be formed from a metal material and includes side panels 66 and a top panel 68 to define a cavity 70 therein. The housing 62 also includes an attachment perimeter 72 that defines an opening 74 that may be selectively closed via a transparent panel 76 that is selectively removable from the housing 62. The transparent panel 76 may be formed from a glass, laminated glass, tempered glass, Plexiglas®, plastic, and/or other practicable materials. It is generally contemplated that the transparent panel 76 may be threadedly coupled to the housing 62, such that during servicing of the illumination system 64 the transparent panel 76 may be threadedly removed from the attachment perimeter 72 of the housing 62 to generally provide access into the cavity 70 of the housing 62.

It is generally contemplated that the illumination system 64 includes a plurality of lighting assemblies 10 positioned within the housing 62 to form a lighting array 80. Stated differently, the lighting array 80 is comprised of the plurality of lighting assemblies 10. The lighting array 80 may be independently powered and operated relative to the air handler units 50, and each light assembly 10 of the lighting array 80 may be independently powered relative to an adjacent light assembly 10. Additionally or alternatively, the lighting assemblies 10 may be collectively powered and individually operated. It is also contemplated that other operative configurations of the lighting assemblies 10 and the lighting array 80 are contemplated, such that all lighting assemblies 10 are uniformly operated as the lighting array 80.

Referring still to FIGS. 1-4, each lighting assembly 10 of the lighting array 80 may be selectively removed from the housing 62 to assist in servicing of the illumination system 64 and/or servicing of a single lighting assembly 10. For example, one of the lighting assemblies 10 may be removed from the lighting array 80 for servicing of any one of the components. Additionally or alternatively, the lighting assembly 10 may be removed for servicing of the lighting array 80 and/or the illumination system 64 as a whole. It is generally contemplated that the housing 62 may contain electrical components 82 that may provide electrical power and/or communication within the illumination system 64.

With reference now to FIGS. 2-5 and 12, a single light assembly 10 is described in more detail herein. It is generally contemplated that the details described with respect to the single lighting assembly 10 may be incorporated or otherwise applied to each lighting assembly 10 within the illumination system 64. As mentioned above, the lighting assembly 10 includes the upper mount 12, the lower mount 20, and the light module 32. A central shaft 100 is rotatably coupled to the upper mount 12 and operably coupled to the lower mount 20. The central mount 100 may assist in the alignment of the lower mount 20 and the upper mount 12 and is configured to rotate within the upper mount 12, as described herein.

Figure 5:
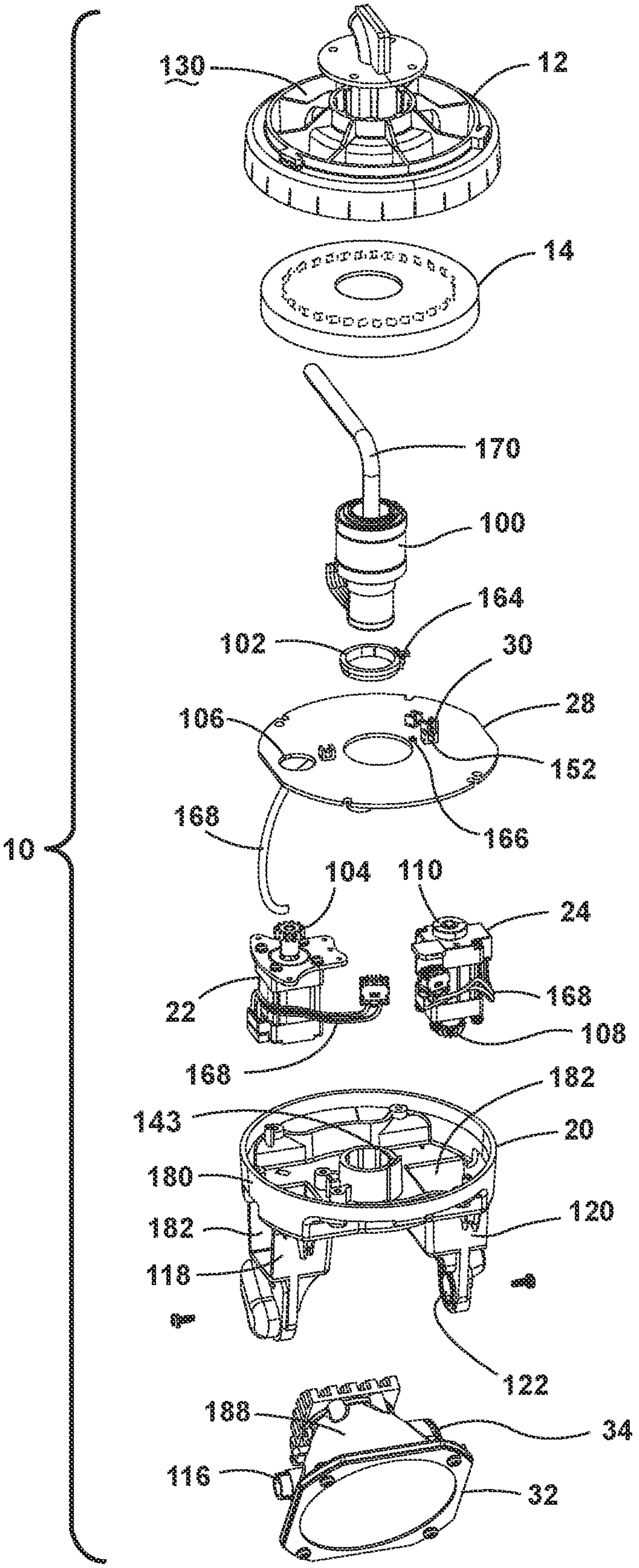
FIG. 5 is an exploded top perspective view of a lighting assembly of the present disclosure.
Figure 6A:
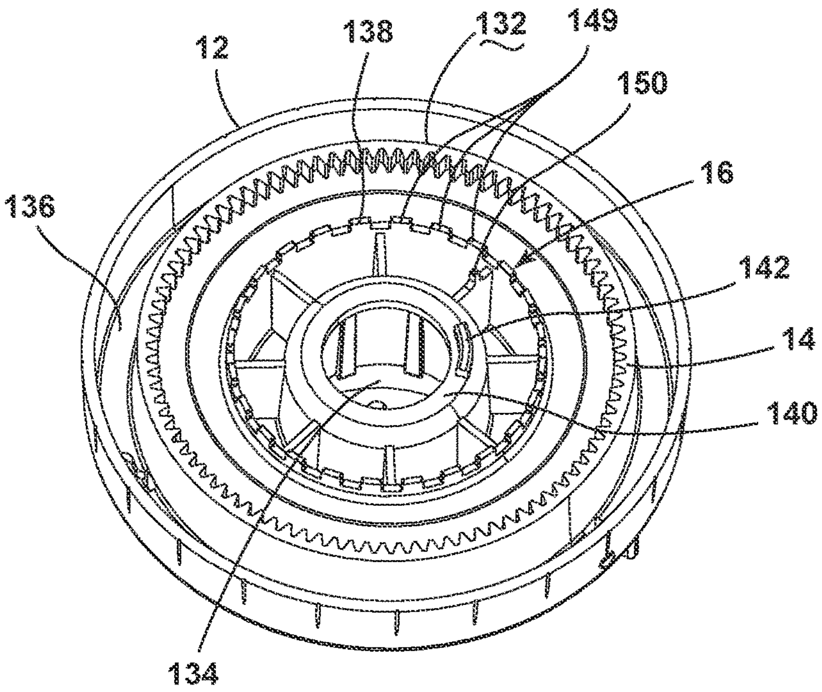
FIG. 6A is a bottom perspective view of an upper mount having a pan gear and indicator flanges of the present disclosure.
Figure 6B:
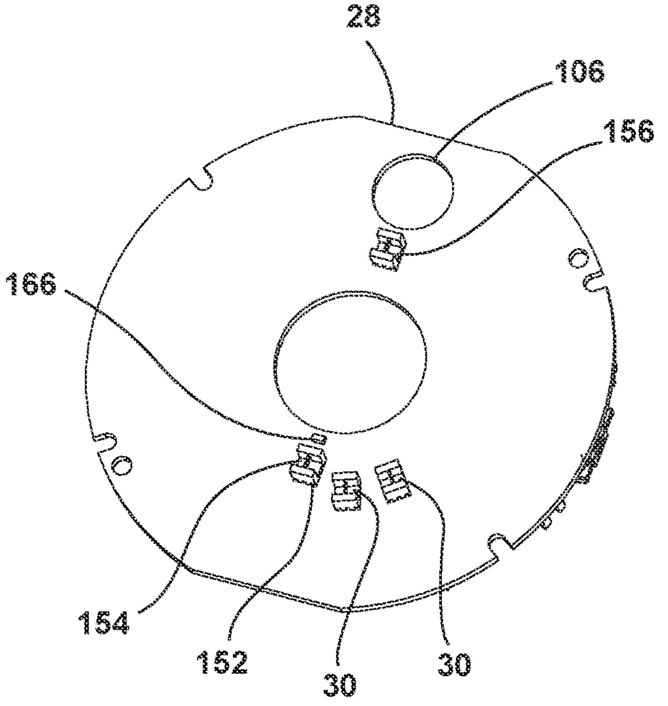
FIG. 6B is a top perspective view of a printed circuit board of the present disclosure.
Figure 6C:
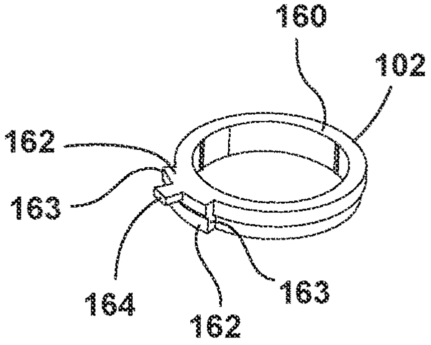
FIG. 6C is a top perspective view of an actuator ring of the present disclosure.

An actuator ring 102 is disposed around the central shaft 100 proximate to the upper mount 12 and the printed circuit board 28. The actuator ring 102 is configured to selectively engage with at least one of the sensors 30 on the printed circuit board 28, as described in more detail herein. The first actuation device (e.g., the pan motor 22) is illustrated as including a first drive gear 104 that extends through an aperture 106 defined in the printed circuit board 28. The first drive gear 104 and the pan gear 14 form a first gearing assembly 109 (FIG. 7) between the upper and lower mounts 12, 20 configured to rotate the lower mount 20 relative to the upper mount 12. The second actuation device (e.g., the tilt motor 24) includes a second drive gear 108, described herein. The first drive gear 104 and the second drive gear 108 selectively engage, or interlock with, the pan gear 14 and the tilt gear 34, respectively. As illustrated in FIG. 5, the second actuation device 24 also includes a magnet 110 coupled to the second actuation device 24 proximate to the printed circuit board 28. The printed circuit board 28 includes a Hall sensor 112 (FIG. 8) configured to detect the magnet 110 during operation of the second actuation device 24, described further herein. It is also contemplated that other sensors may be utilized to detect the magnet 110 including, but not limited to, reed switch sensors.

The pan motor 22 and the tilt motor 24 are disposed within the lower mount 20. The lower mount 20 includes a first arm 118 and a second arm 120. The first and second arms 118, 120 are configured to couple the light module 32 to the lower mount 20. Each of the arms 118, 120 includes a retention aperture 122 in which an attachment feature 124 of the light module 32 is disposed. It is generally contemplated that the pan motor 22 is disposed within the first arm 118, and the tilt motor 24 is disposed within the second arm 120. The operation of the pan and tilt motors 22, 24 along with the pan and tilt gears 14, 34, respectively, are described in more detail herein.

With reference now to FIGS. 5-8, the upper mount 12 includes an outer surface 130 and an inner surface 132 and defines a central aperture 134 through which the central shaft 100 extends. The inner surface 132 includes a peripheral recess 136 proximate to the peripheral rim 18 and a central ring 138 from which the plurality of indicator flanges 16 extend. The pan gear 14 is defined proximate to the peripheral recess 136 along the peripheral rim 18, such that the pan gear 14 is circumferentially disposed around the central ring 138 of the upper mount 12. In some examples, the pan gear 14 is provided separately from the upper mount 12 and is fixedly or otherwise non-rotatably coupled with the upper mount 12 via one or more fasteners (e.g., screws, adhesives, bolts, etc.) or mating connections (e.g., flanges, a keyed groove). In some examples, the pan gear 14 is contemplated to be integrally formed with the upper mount 12, such that the upper mount 12 and the pan gear 14 may be formed via an injection molding process. The upper mount 12 also includes a central housing 140 that defines the central aperture 134 through which the central shaft 100 extends. The central housing 140 includes a first mechanical stop 142. A second mechanical stop 143 extends upwardly from the lower mount 20. Together, the mechanical stops 142, 143 are configured to restrict rotation of the lower mount 20 relative to the upper mount 12 via engagement with the actuator ring 102, as described in more detail herein.

The upper mount 12 is rotatably coupled to the lower mount 20 via the first drive gear 104 and the pan motor 22. The pan gear 14 engages the first drive gear 104, which extends from the pan motor 22 within the lower mount 20. It is generally contemplated that the upper mount 12 is fixed relative to the lower mount 20, such that the engagement between the first drive gear 104 and the pan gear 14 results in the circumferential rotation of the lower mount 20 relative to the upper mount 12. As mentioned above, the first drive gear 104 is aligned with and extends through the aperture 106 defined by the printed circuit board 28 and selectively engages, or interlocks with, the pan gear 14 of the upper mount 12 to rotate the lower mount 20. Stated differently, the pan motor 22 may be in communication with the pan gear 14 through the aperture 106. The printed circuit board 28 includes the plurality of sensors 30, and the plurality of indicator flanges 16 centrally and circumferentially extend from the upper mount 12 toward the plurality of sensors 30. The plurality of indicator flanges 16 selectively engage with the sensors 30 disposed along the printed circuit board 28.

The indicator flanges 16 selectively pass through the sensors 30 to indicate a position of the lower mount 20 relative to the upper mount 12.

Referring still to FIGS. 5-8, the indicator flanges 16 include a plurality of outer flanges 149 and a home indicator flange 150 spaced radially inwardly from the outer flanges 149. The sensors 30 of the printed circuit board 28 include at least one home sensor 152 configured to detect the home indicator flange 150. It is also contemplated that the at least one home sensor 152 of the printed circuit board 28 may include a first home sensor 154 and a second home sensor 156. The plurality of sensors 30, including the at least one home sensor 152, rotate relative to the indicator flanges 16 and detect the indicator flanges 16 as each passes through a respective sensor 30. The home sensor 152 is configured to detect when a full rotation has been completed by the lower mount 20 relative to the upper mount 12 by detecting the home indicator flange 150.

Figure 7:
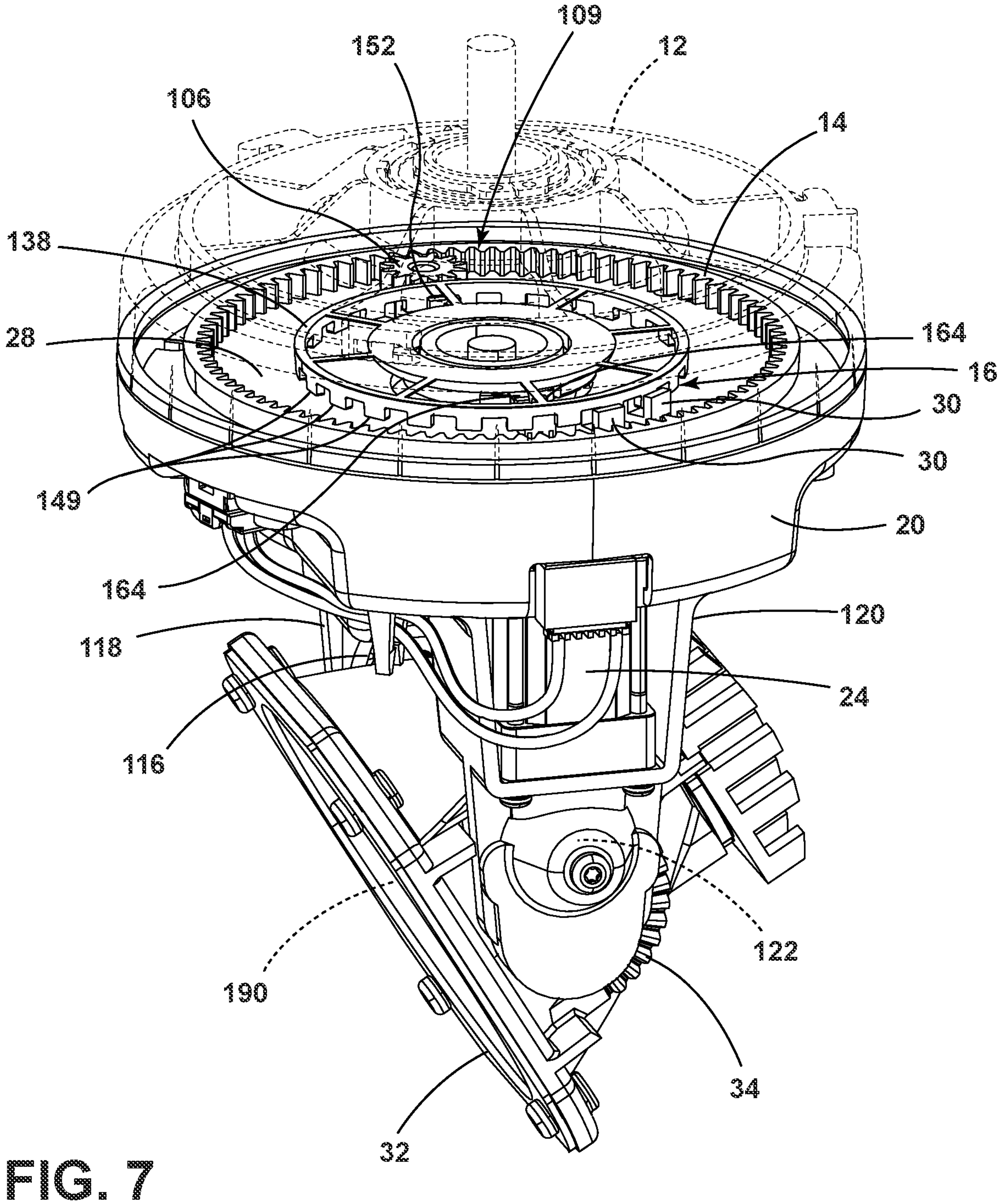
FIG. 7 is a side perspective view of a lighting assembly of the present disclosure with an upper mount partially illustrated in phantom.
Figure 8:
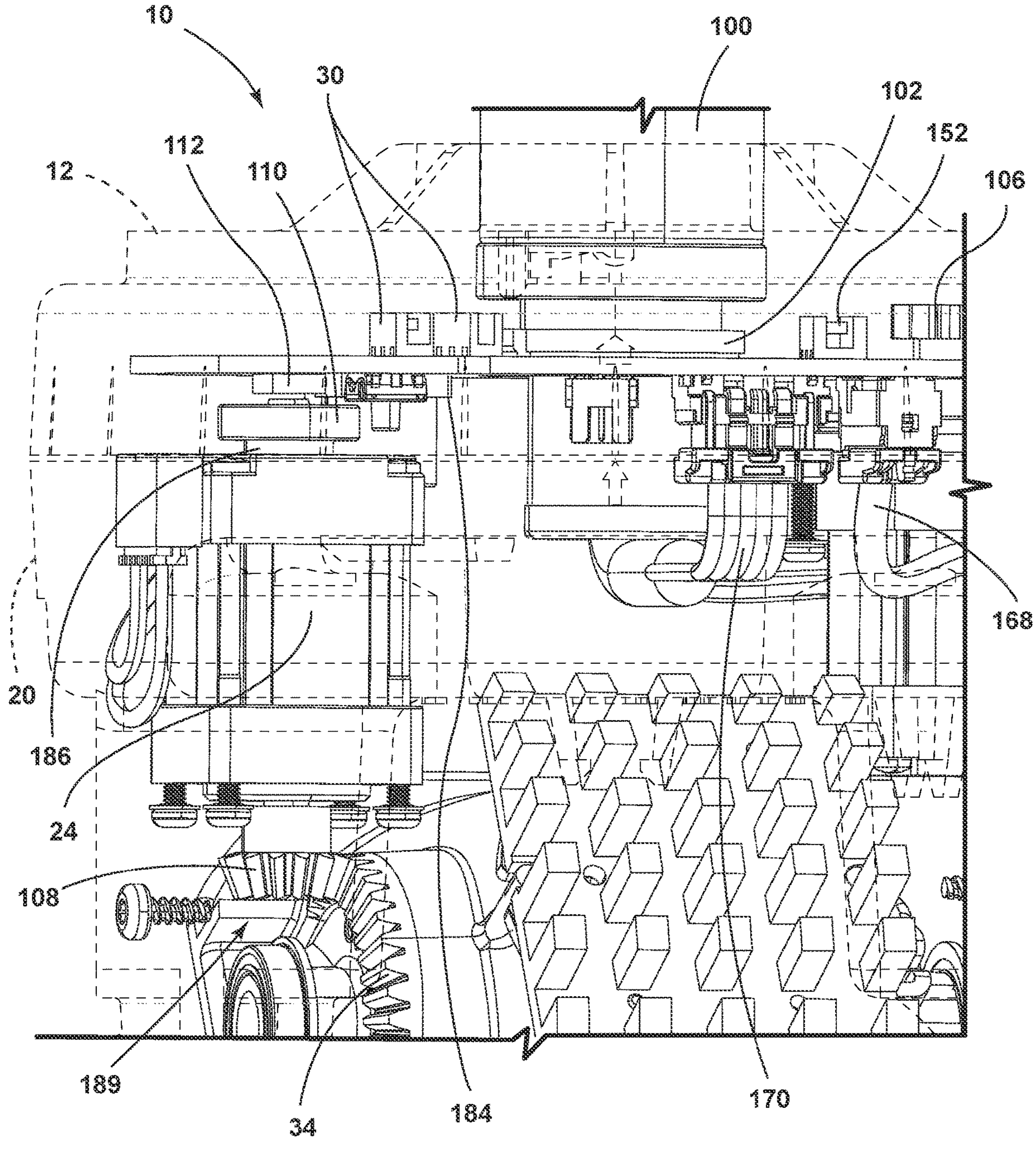
FIG. 8 is an enlarged partial cross-sectional view of the lighting assembly of FIG. 7 with a magnet and a Hall sensor of the present disclosure and a printed circuit board with sensors of the present disclosure.
Figure 9:
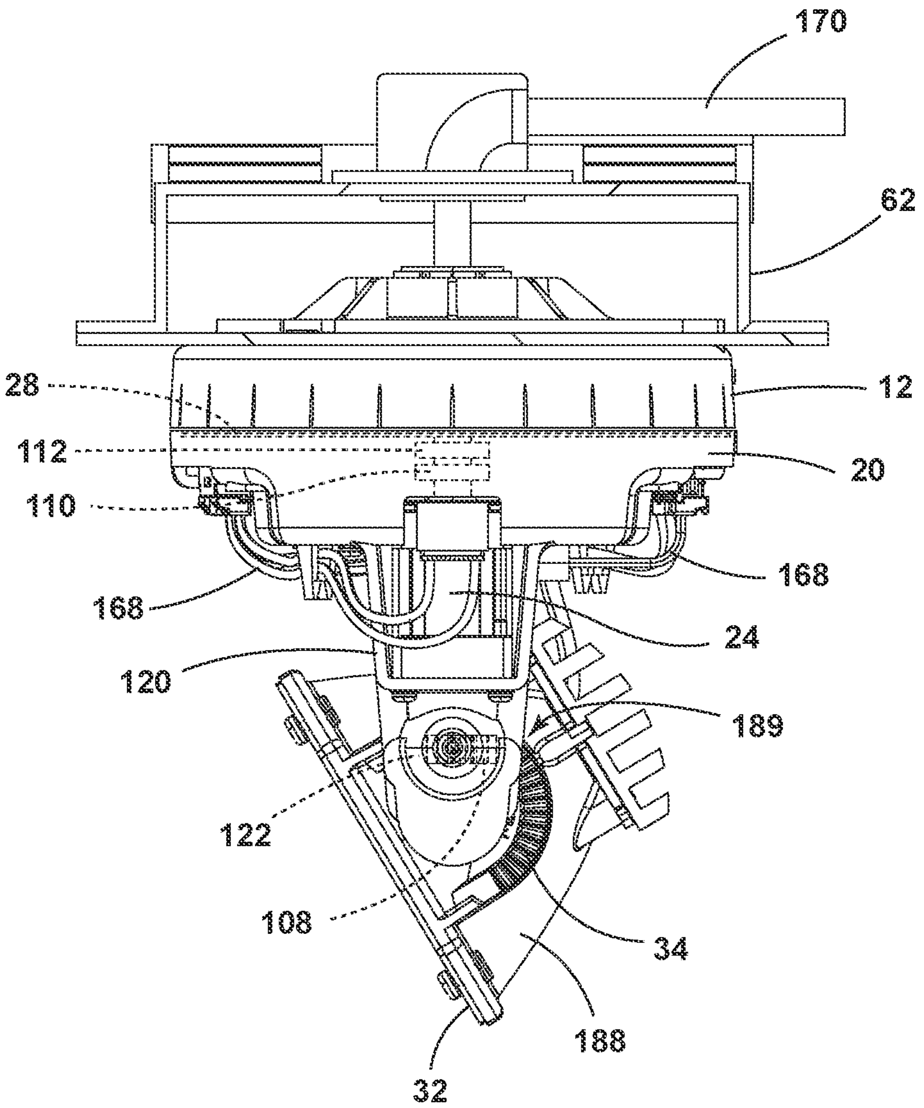
FIG. 9 is a side elevational view of a lighting assembly of the present disclosure with a tilt gear defined along a light module of the present disclosure.
Figure 10:
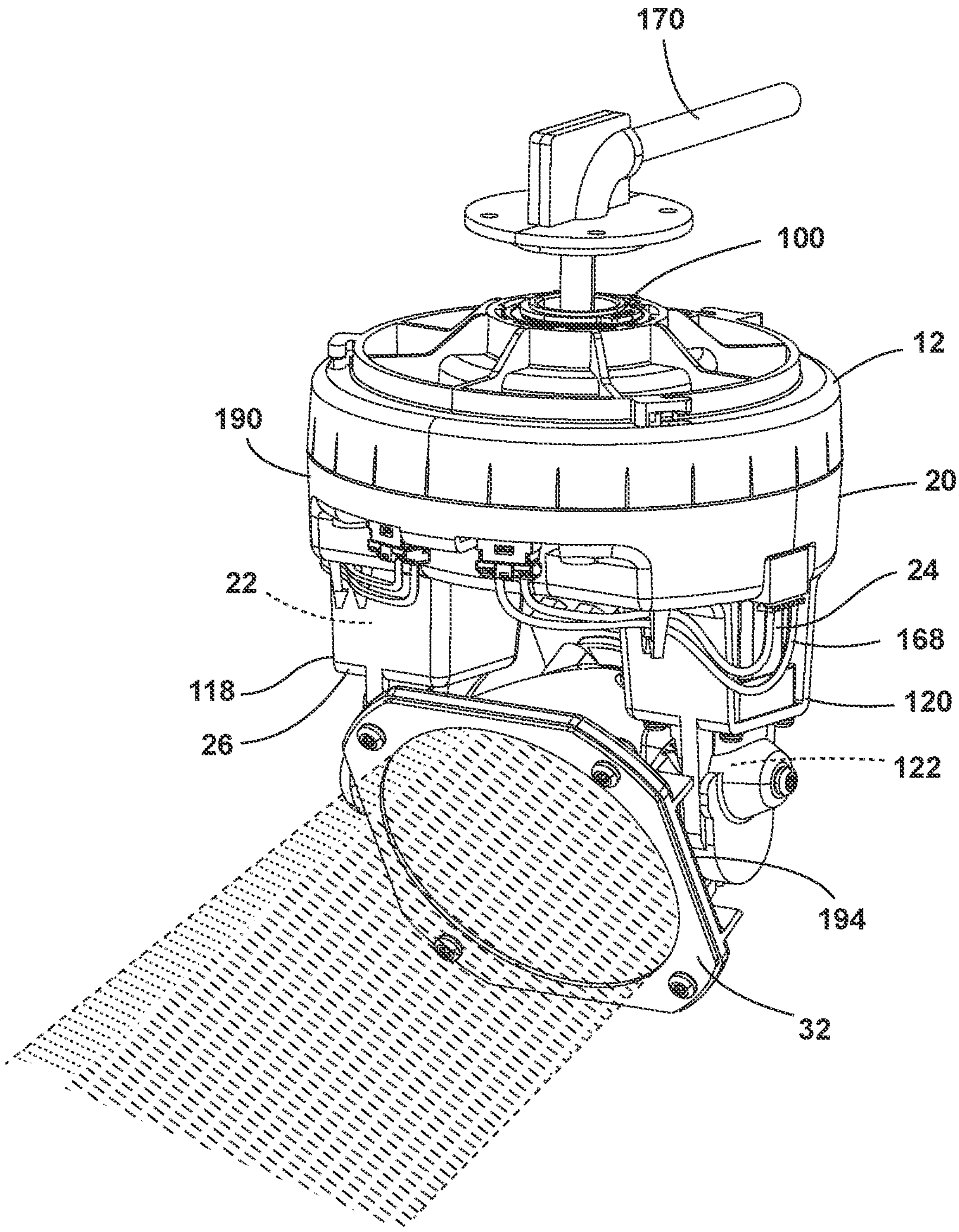
FIG. 10 is a side perspective view of a light module of the present disclosure in a first position.

As illustrated in FIG. 7, the printed circuit board 28 is configured with the first home sensor 154 and the second home sensor 156, as mentioned above. The home indicator flange 150 may be detected by both the first home sensor 154 and the second home sensor 156. It is generally contemplated that the second home sensor 156 may detect the home indicator flange 150 when the lower mount 20 has rotated an additional 180 degrees relative to the upper mount 12. Additionally or alternatively, the second home sensor 156 may be configured as part of a detection storage system 158 (FIG. 12) configured within the controller 36 (FIG. 12) to verify with the controller 36 (FIG. 12) that the lower mount 20 has completed a full rotation. For example, it is contemplated that the detection storage system 158 (FIG. 12) may store the position of the lower mount 20 in the event of a power outage, such that the controller 36 (FIG. 12) can accurately resume rotation of the lower mount 20 when power returns.

With further reference to FIGS. 5-8 and 12, the actuator ring 102 is disposed around the central shaft 100 proximate to the printed circuit board 28. The actuator ring 102 includes a circumferential body 160 and an engagement feature 162 extending outwardly from the circumferential body 160. The engagement feature 162 includes a pair of side surfaces 163 that are configured to engage the first and second mechanical stops 142, 143. For example, at a hard stop position of a rotation of the lower mount 20, the mechanical stops 142, 143 may engage opposite side surfaces 163, with a first of the side surfaces 163 engaging the first mechanical stop 142 and a second of the side surfaces 163 engaging the second mechanical stop 143. In this way, the mechanical stops 142, 143 may sandwich the actuator ring 102 and limit rotation of the lower mount 20. A proximity tab 164 extends from the engagement feature 162 of the actuator ring 102. The plurality of sensors 30 of the printed circuit board 28 also includes a proximity sensor 166 that detects the proximity tab 164 of the actuator ring 102. The proximity sensor 166 is configured to detect the proximity tab 164 at a first point and a second point.

The proximity tab 164 passes over the proximity sensor 166 to communicate with the controller 36 the position of the lower mount 20 relative to the upper mount 12 as the lower mount 20 rotates. Stated differently, the proximity tab 164 and the proximity sensor 166 cooperate to inform the controller 36 as to the rotational position of the lower mount 20. By way of example, and not limitation, the lower mount 20 may be rotated approximately 540 degrees relative to the upper mount 12, and the proximity tab 164 and the proximity sensor 166 cooperate to inform the controller 36 of the rotational position of the lower mount 20.

It is generally contemplated that the lower mount 20 is configured to rotate approximately 540 degrees relative to the upper mount 12. The home indicator flange 150 may pass within the home sensor 152 two times during a single rotation. The proximity tab 164 remains over the proximity sensor 166 during the first 270 degrees of rotation of the lower mount 20 relative to the upper mount 12. The first mechanical stop 142 engages the engagement feature 162 after the initial 270 degrees of rotation, which displaces the proximity tab 164 from the proximity sensor 166. The displacement of the proximity tab 164 indicates to the controller 36 that the lower mount 20 is displaced from a home position relative to the upper mount 12. Stated differently, the home indicator flange 150 may be disposed in either of the first or second home sensors 154, 156 while being displaced from the home position when the proximity tab 164 is displaced from the proximity sensor 166.

Referring still to FIGS. 5-8 and 12, the engagement feature 162 can also be configured as a failsafe stopping mechanism to prevent additional rotation of the lower mount 20 past the pre-defined 540 degree rotational limit. If the pan motor 22 were to rotate the lower mount 20 past the 540 degree rotational mark, then the engagement feature 162 would engage with the first mechanical stop 142 defined by the upper mount 12 to prevent any additional rotation of the lower mount 20 in that direction. It is also contemplated that the first mechanical stop 142 and the engagement feature 162 of the actuator ring 102 are configured to minimize strain on electrical wiring 168 during rotation of the lower mount 20. Stated differently, the electrical wiring 168 between the printed circuit board 28, the controller 36, and each of the pan and tilt motors 22, 24 may be configured in a wire harness 170, and the engagement of the first mechanical stop 142 with the engagement feature 162 assists in minimizing potential strain and/or pulling on the wire harness 170 to extend the useful life of the wire harness 170.

Figure 11:
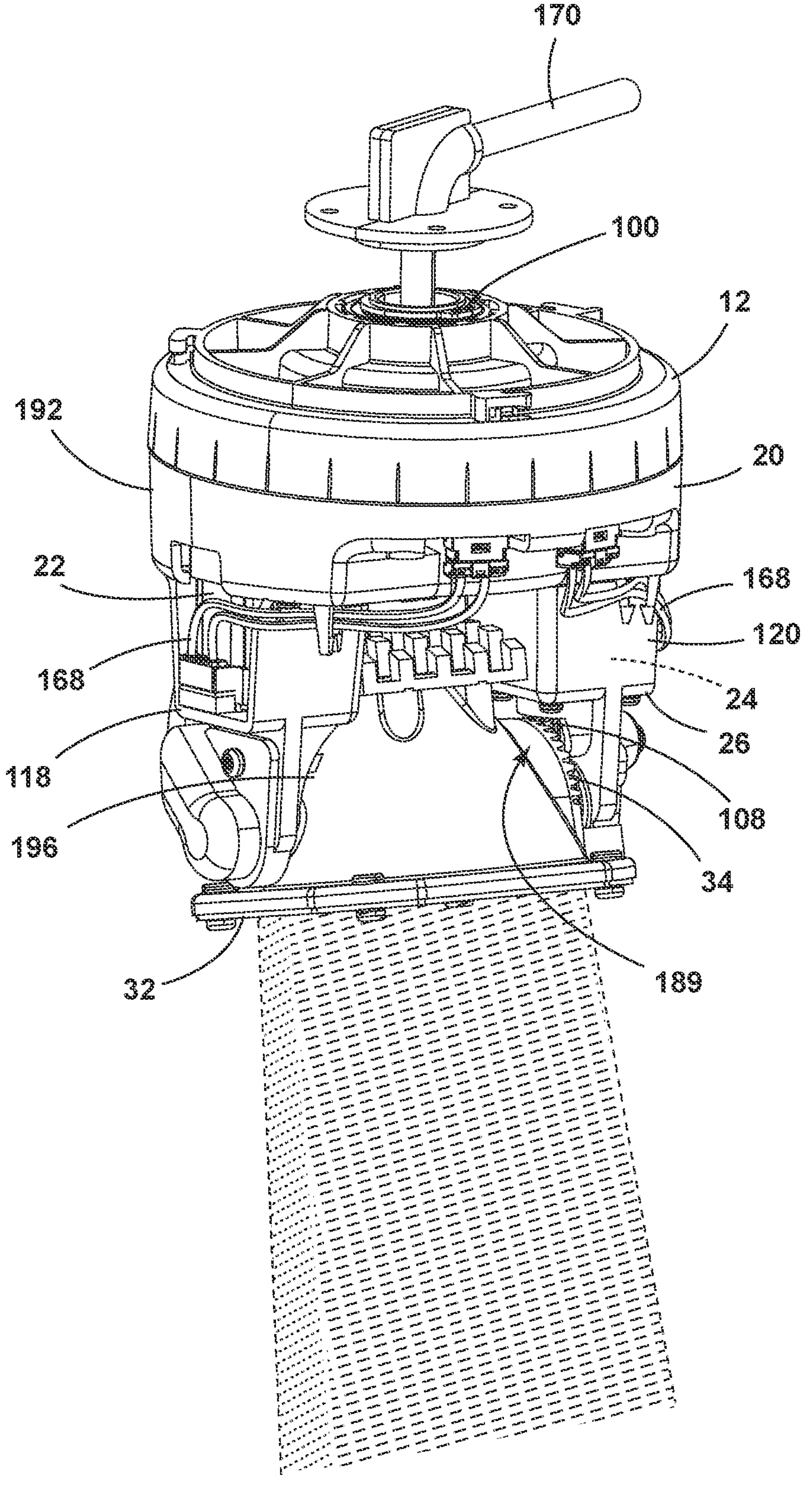
FIG. 11 is a side perspective view of the light module of FIG. 10 in a second, tilted position.

With reference to FIGS. 5 and 9-12, the lower mount 20 includes a body 180 from which the arms 118, 120 extend. Each of the arms 118, 120 defines a space 182 in which at least one of the pan motor 22 and the tilt motor 24 are disposed. The spaces 182 of the arms 118, 120 may be opposite one another, as depicted, to house the motors 22, 24 opposite one another (e.g., 180 degrees from one another). The pan motor 22 may be disposed within the first arm 118, and the tilt motor 24 may be disposed within the second arm 120. As mentioned above, the pan motor 22 is operably coupled with the first drive gear 104 and is configured to rotate the lower mount 20 relative to the upper mount 12. The pan motor 22 rotates the lower mount 20 between a first position 190 (FIG. 10) and a plurality of second positions 192. At least one of the plurality of second, rotated positions 192 is illustrated in FIG. 11. The pan motor 22 is configured to face or be aligned with a first direction (e.g., toward the upper mount 12), such that a shaft of the pan motor 22 extends along the first direction.

The tilt motor 24 is configured to tilt or otherwise angle the light module 32 relative to the lower mount 20. The tilt motor 24 is configured to face or be aligned with a second direction opposite the first direction (e.g., away from the upper mount 12), such that a shaft of the tilt motor 24 extends along the second direction. The tilt motor 24 tilts the light module 32 between a first position 194 (FIG. 10) and a plurality of second, tilted positions 196. At least one of the plurality of second, tilted positions 196 is illustrated in FIG. 11. The tilt motor 24 includes the magnet 110 outwardly extending from the tilt motor 24 proximate to the printed circuit board 28. Stated differently, the magnet 110 is positioned proximate to the Hall sensor 112 disposed on an underside, or opposing surface 184 of the printed circuit board 28 from the proximity sensor 166.

The Hall sensor 112 is configured to detect a magnetic field of the magnet 110 to detect the position of the light module 32 relative to the lower mount 20 and the printed circuit board 28. The Hall sensor 112 is communicatively coupled with the controller 36 to indicate a position of the light module 32 relative to the lower mount 20. The magnet 110 coupled to the tilt motor 24 is configured with a dual hemispherical polarity, such that the Hall sensor 112 may detect the position of the magnet 110 based on the pole position. The magnet 110 rotates about a shaft 186 coupled to the tilt motor 24 as the tilt motor 24 tilts or otherwise actuates the light module 32 relative to the lower mount 20. The rotation of the magnet 110 indicates to the Hall sensor 112 the position of the light module 32 relative to the lower mount 20.

With further reference to FIGS. 5 and 9-12, the light module 32 includes the tilt gear 34 proximate to the second arm 120 of the lower mount 20. The tilt gear 34 is coupled with a light housing 188 of the light module 32 and defines an arcuate configuration. The tilt gear 34 may be separately formed and operably coupled to the light housing 188. For example, the tilt gear 34 may be provided separately from the light housing 188 and be fixedly or otherwise non-rotatably coupled with the light housing 188 via one or more fasteners (e.g., screws, adhesives, bolts, etc.) or mating connections. Additionally or alternatively, the title gear 34 may be integrally formed with the light housing 188. The second drive gear 108 extends from the tilt motor 24 and is operably coupled to the tilt gear 34. The second drive gear 108 and the tilt gear 34 form a second gearing assembly 189 between the lower mount 20 and the lighting module 32 configured to rotate the lighting module 32 relative to the lower mount 20. The second drive gear 108 engages the tilt gear 34 as the second drive gear 108 is activated by the tilt motor 24. Stated differently, the second drive gear 108 engages with the tilt gear 34 to rotate and tilt the light module 32 relative to the lower mount 20. The tilt motor 24 simultaneously rotates the magnet 110 and the second drive gear 108, such that the rotation of the magnet 110 corresponds to the tilt of the light module 32. The rotation of the second drive gear 108 along the tilt gear 34 ultimately rotates and/or tilts the light module 32 relative the lower mount 20. The rotation of the second drive gear 108 along the tilt gear 34 corresponds with the rotation of the magnet 110, such that the Hall sensor 112 can detect the tilt of the light module 32 based on the rotational position of the magnet 110.

With reference again to FIGS. 1-12, the controller 36 is configured to detect both the position of the lower mount 20 and the light module 32 based on the detection of the indicator flanges 16, the proximity tab 164, and the magnet 110, respectively. The detection storage system 158 of the controller 36 is configured to at least temporarily store the rotational position of both the lower mount 20 and the light module 32. For example, the detection storage system 158 receives updated rotational positions of the lower mount 20 from the sensors 30 and confirms whether the pan and tilt motors 32, 34 are operating according to the input commands. The controller 36 repeatedly receives signals from the sensors 30 that provide position data of the lower mount 20 and the light module 32. It is generally contemplated that the controller 36 may deactivate one of the lighting assemblies 10 if the detection storage system 158 detects an inconsistent rotational or tilt movement of either the lower mount 20 and/or the light module 32, respectively.

It is generally contemplated that the controller 36 may activate a reverse operation to rotate the lower mount 20 back to a start position once the sensors 30 on the printed circuit board 28 detect a complete rotation of the lower mount 20. The controller 36 operates the rotational function of the lower mount 20 via activation of the pan motor 22 and also operates the tilt function of the light module 32 via activation of the tilt motor 24. It is also contemplated that the controller 36 is configured to adjust and activate a brightness of the light module 32 during operation. The controller 36 may be selectively activated via a user interacting with a user interface 200 or other user control. By way of example, not limitation, the user interface 200 may be a wireless computing device connected to the controller 36 via a wireless network 202.

Additionally or alternatively, the network 202 and/or the user interface 200 may include wired connections. It is also contemplated that the user interface 200 may be communicatively coupled with the controller 36 in each of the lighting assemblies 10 of the illumination system 64, such that the user interface 200 may activate a single light assembly 10 within the illumination system 64 and/or activate multiple lighting assemblies 10. The user interface 200 may also be configured with indicia associated with various functions of the lighting assembly 10 including, but not limited to, rotation and/or tilting of the lower mount 20 and light module 32, respectively.

Figure 13:
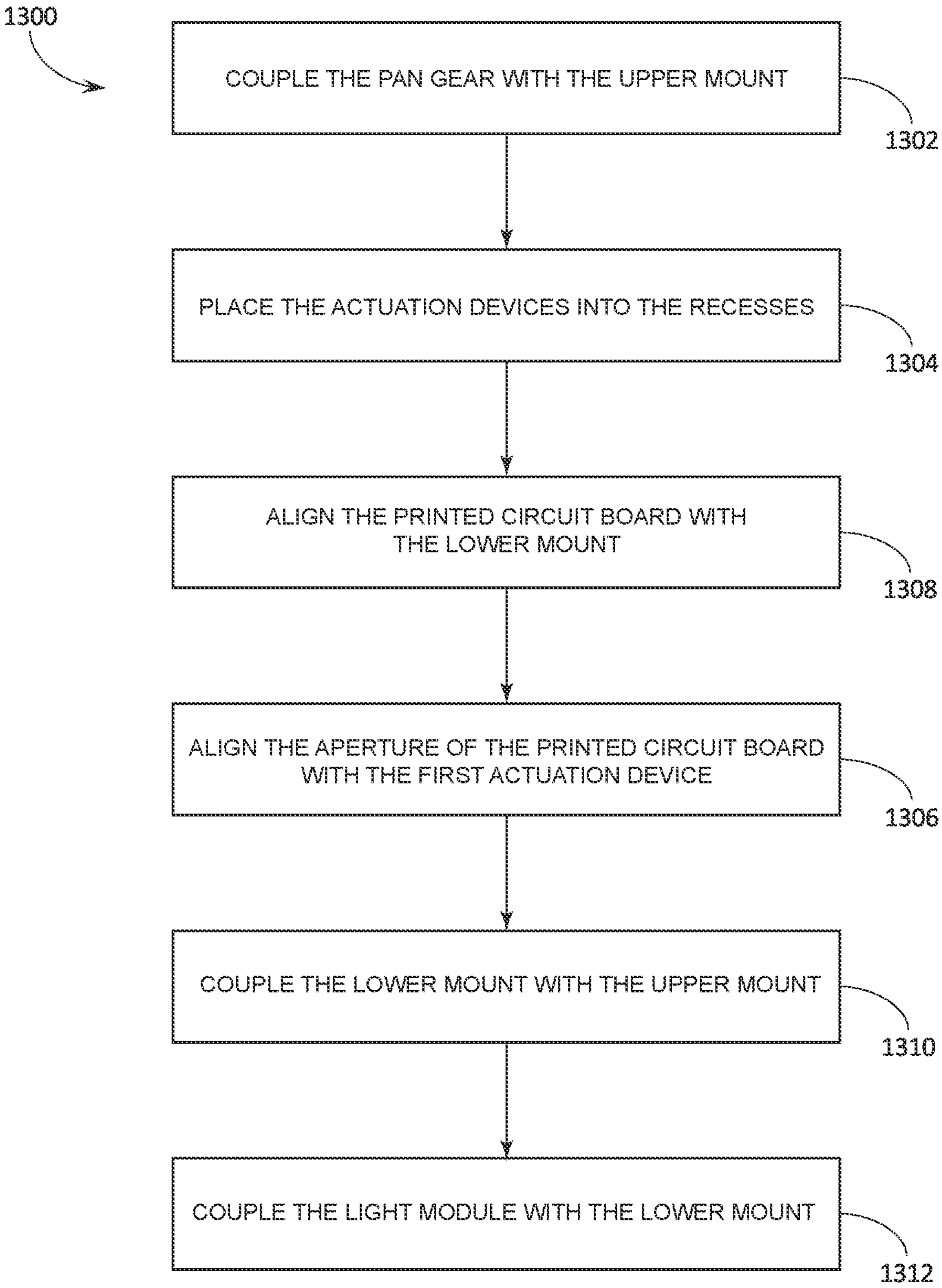
FIG. 13 is a flow diagram of a method of making a lighting assembly of the present disclosure.

Referring now to FIG. 13, a method 1300 of making, or assembling, a lighting assembly 10 includes coupling the pan gear 14 with the upper mount 12 at step 1302. At step 1304, the actuation devices 22, 24 are placed into recesses, such as the spaces 182, with the first actuation device (e.g., the pan motor 22) facing upward and the second actuation device (e.g., the tilt motor 24) facing downward. In general, an orientation of the first actuation device 22 may be generally opposite an orientation of the second actuation device 24. The second actuation device 24 may 24 may be aligned with the Hall sensor 112 that is coupled to the underside surface of the printed circuit board 28. The printed circuit board 28 is aligned with the lower mount 20 at step 1306. At step 1308, the aperture 106 of the printed circuit board 28 is aligned with the first actuation device 22 to allow the first drive gear 104 to extend from the lower mount 12 into the upper mount 12. The lower mount 20 is coupled with the upper mount 12 to interlock the first drive gear 104 and the pan gear 14, and thus provide communication between the first actuation device 22 and the pan gear 14, at step 1310. The lower mount 20 may couple with the upper mount 12 via a bolt extending through the central aperture 134 (e.g., formed with the central shaft 100) and nut. In some examples, the light module 32 is then coupled with the lower mount 20 at step 1312. It is contemplated that these steps are not limiting, and that other steps may be included in the method 1300, such as connection of wiring to the individual output devices of the lighting assembly 10 (e.g., the motors 22, 24, light source, etc.), as well as connection to the housing 62 and wiring to the controller 36 and/or the electrical components 82.

Figure 14:
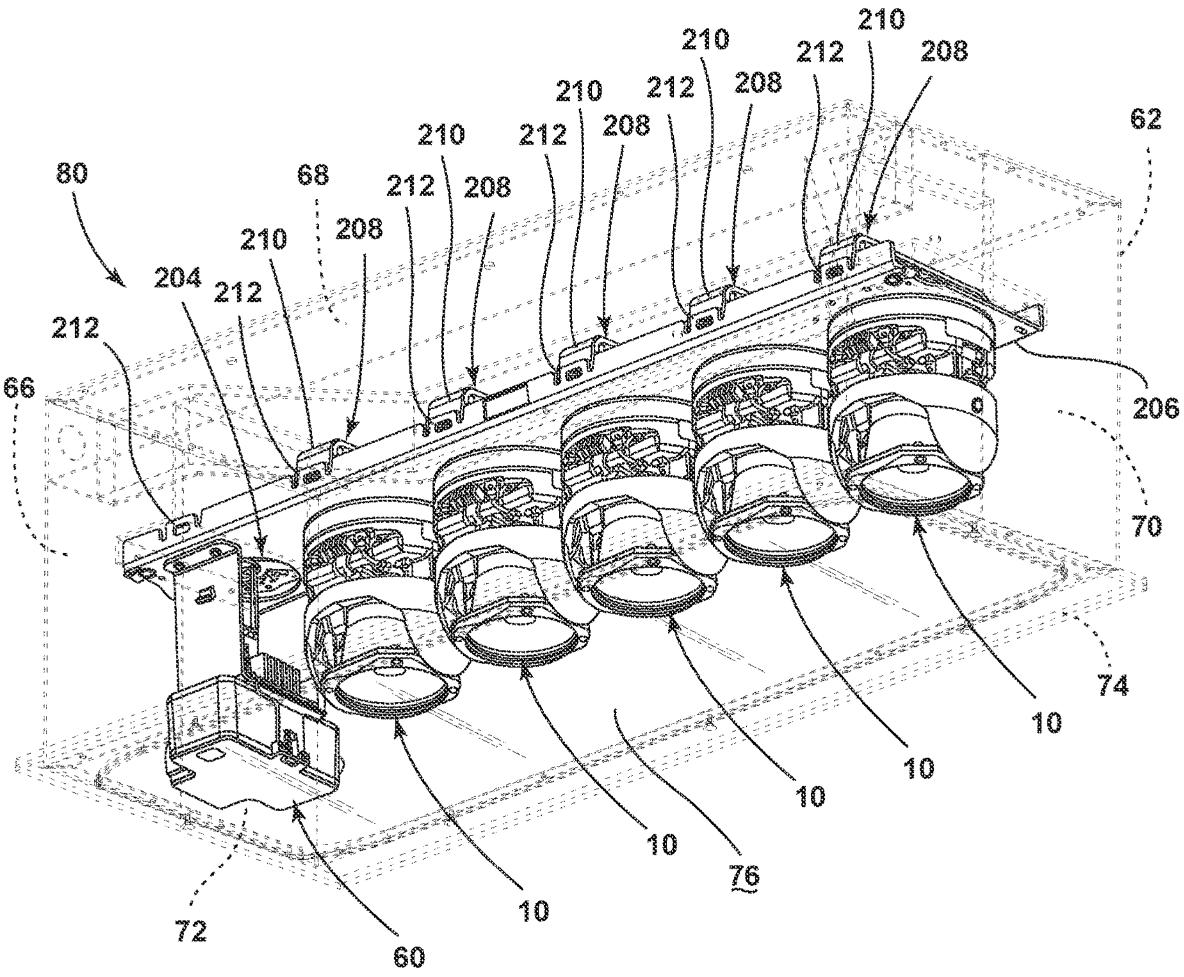
FIG. 14 is a bottom perspective view of a lighting array of the present disclosure.

Referring now to FIG. 14, one example of the illumination system 64 includes the imaging device 60 being disposed at an end of the lighting array 80. Each lighting assembly 10 may be received in a socket 204 defined by a support structure 206 disposed within the housing 62. Each wire harness 170 may pass through the socket 204 to couple with the electrical components 82. In some examples, a connection interface 208 is provided for each lighting assembly adjacent to a backside of the support structure 206 and is configured to align the wire harness 170. The connection interface 208 includes a bracket 210 and a mating clip 212 configured to receive the bracket 210 to mount the bracket 210 with the support structure 206. In some examples, the connection interface 208 is configured to rigidly secure the wire harness 170 to limit tangling and guide the wire harness 170 to the electrical components 82 and/or the controller 36. It is contemplated that the support structure 206 may be formed with more sockets 204 than lighting assemblies 10 to allow for rearrangement of the lighting array 80 and the imaging device 60 to allow the illumination system 64 to be customized for a given application. For example, the support structure 206 illustrated in FIG. 14 may alternatively include a sixth lighting assembly 10 instead of the imaging device 60.

In general, the arrangement of the actuation devices (e.g., the first and second motors 22, 24) and/or the printed circuit board 28 may provide for a reduced packaging size, and further may allow for a reduced cost. The modularity of the lighting assembly 10 may further allow for ease of replacement for individual lighting assemblies of the lighting array 80. Further, the non-rotational relationship of the pan gear 14 with the upper mount 12 and the tilt gear 34 with the light module 32 may maximize the overall useful life of the light assembly 10. The 540 degrees of rotation also provides maximum lighting options during surgical procedures and/or other situations in which the rotation of the lighting assembly 10 may be advantageous. In addition, the inclusion of the plurality of sensors 30 within the lighting assembly 10 advantageously provides the controller 36 with position verification of the lower mount 20 and the light module 32, respectively.

The indicator flanges 16 cooperate with the plurality of sensors 30 to detect the rotation of the lower mount 20 relative to the upper mount 12. The controller 36 is in constant communication with the printed circuit board 28 regarding the position of the lower mount 20 relative to the upper mount 12. By way of example, not limitation, the controller 36 may store the rotational information detected by the plurality of sensors 30 within the detection storage system 158 to minimize disruption as a result of any potential power outages. Stated differently, the controller 36 may detect the incremental position of the lower mount 20 to detect whether the lower mount 20 has moved relative to the home position. If the lower mount 20 has moved, then the controller 36 may reposition the lower mount 20 to the home position, such that the home indicator flange 150 is detected by the home sensor 152. Additionally or alternatively, the controller 36 may detect whether the pan and/or tilt motors 32, 34 are executing the instructions from the controller 36 properly, such that significant deviations from the instructions may result in the controller 36 deactivating the respective lighting assembly 10.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A lighting assembly, comprising:

an upper mount and a lower mount coupled with the upper mount;

a central shaft coupled between the upper and lower mounts configured to rotate the lower mount relative to the upper mount;

a printed circuit board with a proximity sensor, the printed circuit board defining a central aperture and the central shaft extends through the central aperture; and an actuator ring disposed around and rotatable with the central shaft, wherein the proximity sensor is configured to detect a position of the actuator ring to indicate a position of the lower mount relative to the upper mount.

2. The lighting assembly of claim 1, wherein the actuator ring includes an engagement feature that engages with at least one mechanical stop extending from at least one of the upper mount and the lower mount to limit rotation of the actuator ring during the rotation of the lower mount.

3. The lighting assembly of claim 2, wherein the at least one mechanical stop includes a first mechanical stop extending from the upper mount and a second mechanical stop extending from the lower mount, wherein the engagement feature includes a pair of side surfaces configured to engage with the first and second mechanical stops.

4. The lighting assembly of claim 3, wherein the actuator ring includes a proximity tab extending from the engagement feature that is detectable by the proximity sensor at the first mechanical stop and the second mechanical stop.

5. The lighting assembly of claim 1, wherein the actuator ring includes a proximity tab that is detectable by the proximity sensor.

6. The lighting assembly of claim 1, wherein the printed circuit board is operably coupled to a pan motor that rotates the central shaft by a wire harness, the wire harness extending at least partially through the central shaft to the printed circuit board.

7. The lighting assembly of claim 1, wherein a light module is coupled to the lower mount and includes a tilt gear and a drive gear configured to tilt the light module relative to the lower mount.

8. A lighting assembly, comprising:

an upper mount and a lower mount coupled and configured to rotate relative to the upper mount;

at least one indicator flange operably coupled to one of the lower mount and the upper mount;

a printed circuit board operably coupled to a different one of the lower mount and the upper mount than the at least one indicator flange and including a plurality of sensors, the plurality of sensors selectively engaged with the at least one indicator flange during relative rotation; and a controller operably coupled to the printed circuit board and configured to determine a position of the lower mount relative to the upper mount based on the selective engagement between the at least one indicator flange and the plurality of sensors.

9. The lighting assembly of claim 8, wherein the upper mount includes a pan gear and the lower mount includes a first drive gear that, together, form a first gearing assembly configured to rotate the lower mount relative to the upper mount.

10. The lighting assembly of claim 9, further including a light module coupled to the lower mount and includes a tilt gear and a second drive gear configured to tilt the light module relative to the lower mount.

11. The lighting assembly of claim 10, further including an imaging device configured to capture images.

12. The lighting assembly of claim 11, wherein the controller is further configured to:

adjust the position of the light module based on the images.

13. The lighting assembly of claim 8, wherein the at least one indicator flange includes a plurality of indicator flanges.

14. The lighting assembly of claim 13, wherein the plurality of indicator flanges includes a home indicator flange, and wherein the plurality of sensors includes at least one home sensor configured to detect the home indicator flange.

15. The lighting assembly of claim 14, wherein the at least one home sensor includes a first home sensor and a second home sensor.

16. The lighting assembly of claim 14, wherein the controller is further configured to:

determine a full rotation has been completed by the lower mount relative to the upper mount by detecting the home indicator flange by the at least one home sensor.

17. The lighting assembly of claim 8, wherein the at least one indicator flange is located on the upper mount and the printed circuit board is located on the lower mount.

18. A lighting assembly, comprising:

an upper mount and a lower mount coupled and configured to rotate relative to the upper mount with a first drive gear;

a light module coupled to the lower mount including a second drive gear configured to tilt the light module relative to the lower mount;

at least one sensor coupled to the lower mount and configured to detect a position of the lower mount relative to the upper mount; and a controller operably coupled to the at least one sensor, the first drive gear, and the second drive gear, the controller is configured to:

rotate the lower mount and the light module via the first drive gear;

tilt the light module via the second drive gear; and determine the position of the lower mount relative to the upper mount via the at least one sensor.

19. The lighting assembly of claim 18, wherein the first drive gear and the second drive gear are located in the lower mount.

20. The lighting assembly of claim 18, further comprising:

a central shaft coupled between the upper and lower mounts configured to rotate the lower mount relative to the upper mount via the first drive gear; and a printed circuit board with the at least one sensor, the printed circuit board defining a central aperture and the central shaft extends through the central aperture.

* * * * *